United States Patent
Kishimoto

(10) Patent No.: US 8,208,156 B2
(45) Date of Patent: Jun. 26, 2012

(54) IMAGE PROCESSING APPARATUS AND CONTROL METHOD

(75) Inventor: Hiroaki Kishimoto, Lake Success, NY (US)

(73) Assignee: Canon Kabushiki Kaisha, Tokyo (JP)

(*) Notice: Subject to any disclaimer, the term of this patent is extended or adjusted under 35 U.S.C. 154(b) by 1309 days.

(21) Appl. No.: 11/861,153

(22) Filed: Sep. 25, 2007

(65) Prior Publication Data

US 2008/0144103 A1  Jun. 19, 2008

(30) Foreign Application Priority Data

Dec. 13, 2006 (JP) .................................. 2006-336007

(51) Int. Cl.
*G06F 15/00* (2006.01)
(52) U.S. Cl. .................. 358/1.15; 358/1.1; 358/1.16
(58) Field of Classification Search .................. 358/1.1, 358/1.16
See application file for complete search history.

(56) References Cited

FOREIGN PATENT DOCUMENTS

| JP | 2003-271562 A | 9/2003 |
| JP | 2003271562 | * 9/2003 |

OTHER PUBLICATIONS

JP2003-271562 english machine translation.*

* cited by examiner

*Primary Examiner* — King Poon
*Assistant Examiner* — Iriana Cruz
(74) *Attorney, Agent, or Firm* — Canon U.S.A., Inc. IP Division

(57) ABSTRACT

An image processing apparatus is configured to receive a processing flow, which is to be performed by the image processing apparatus, that includes processing for storing data in a storage unit to which an access control has been set, and instructs the processing according to the received processing flow. The image processing apparatus, in performing the processing based on the processing flow, is configured to perform the processing for storing data in the storage unit when the storage unit is under the access control, and to notify a user that the storage unit is not under the access control when the storage unit is not under the access control.

7 Claims, 19 Drawing Sheets

FIG.9

```xml
<?xml version="1.0"?>
<workflow>
    <workflow_data name="WORK FLOW A">
        <function sequence="1" category="copy">
```

901 — 
```xml
<setting name="copy_number">
1
</setting>
```

902 — 
```xml
<setting name="outputsize">
A4
</setting>
```

903 — 
```xml
<setting name="outputcolor">
fullcolor
</setting>
```

```xml
        </function>
        <function sequence="2" category="store">
```

904 — 
```xml
<setting name="storage_id">
10
</setting>
```

905 — 
```xml
<setting name="filetype">
TIFF
</setting>
```

906 — 
```xml
<setting name="filecolor">
fullcolor
</setting>
```

907 — 
```xml
<setting name="password_required">
yes
</setting>
```

```xml
        </function>
    </workflow_data>
</workflow>
```

IMAGE PROCESSING APPARATUS AND CONTROL METHOD

BACKGROUND OF THE INVENTION

1. Field of the Invention

The present invention relates to an image processing apparatus configured to communicate with another image processing apparatus via a communication medium and a control method therefor.

2. Description of the Related Art

In recent years, a digital multifunction peripheral (MFP) has been widely used in a business environment. Such a digital MFP includes various functions such as a copy function, a print function, a scan function, a send function for sending digital image data obtained by scanning to another apparatus via facsimile transmission or e-mail, and a function for storing a digitized document in a storage device, which is internally or externally provided to the digital MFP, as an electronic document.

Various complicated parameters can be set for each of the above-described functions and the functions are performed after making various settings thereto. However, it is inconvenient, in terms of user operability, to perform such complicated settings every time a user operates a digital MFP. In this regard, a conventional digital MFP has a function for performing predetermined settings combined as a group, which can improve user operability.

In addition, a setting, so-called "work flow", which performs functions having various settings in combination, can be defined and set to a digital MFP.

For example, a digital MFP can perform the following operation. First, a digital MFP copies a paper document in a desired number. Then, the digital MFP converts resolution of an electronic document (document image data) obtained by scanning the paper document into predetermined low resolution so that security can be ensured. Then, the digital MFP sends the electronic document having low resolution to a predetermined sending destination by e-mail. Furthermore, the digital MFP notifies to the sending destination that the document has been copied. Moreover, the digital MFP stores the electronic document having an original resolution in a storage device provided within the digital MFP. In addition, the digital MFP performs a security setting so that the stored electronic document can be accessed only by an authorized user. In performing the above-described operations, it is necessary for a user to perform a large number of complicated settings and operations.

A unified pattern of such operations is generally called a "work flow". A user can easily perform a large number of operations by simply issuing an instruction for performing one work flow.

It is more useful and convenient for a user if a user can perform a work flow not only on one digital MFP but also on a plurality of digital MFPs.

This configuration can be useful in a large-sized office in which a plurality of digital MFPs, each having the same functions, is installed.

In a conventional method for executing the same work flow in a plurality of digital MFPs, a work flow defined in one digital MFP is acquired as a file, and then the acquired work flow is input (exported) into another digital MFP, so that the receiving digital MFP can perform the received work flow.

With such a conventional method, the same work flow can be performed in a plurality of digital MFPs. Thus, the user operability can be improved.

In executing the same work flow in a plurality of digital MFPs, it may be important to secure a sufficient level of security in the case of storing image data of a scanned document in a storage device provided in a digital MFP.

The security problem will be described in more detail below.

Suppose that a work flow F defined by a digital MFP M includes a flow for storing an electronic document generated by scanning a paper document in a storage area A of a storage device provided internally in the digital MFP M.

Furthermore, an access control is applied to the storage area A. As an example of the access control, a password is set to the storage area A. Thus, the storage area A is protected by a password, and data can be written in and read from the storage area A only by a user who knows the password.

The user who defines a work flow F is supposed to know that the password is set to the storage area in defining a setting for a series of operations. This is because a user defines a plurality of operations performed by the user in a work flow, and thus the user defines a setting that the user him/herself desires.

The user who performs the work flow F exports a work flow N to another digital MFP N and performs the fork flow N on the digital MFP N.

As described above, a work flow for storing in the storage area A the electronic document (image data) generated based on the scanned paper document has been defined as the work flow F. Accordingly, in executing the work flow F on the digital MFP N, the digital MFP N stores the electronic document in the storage area A of the storage device provided in the digital MFP N.

Here, each of the digital MFPs internally includes a storage device, and thus has a storage area to which the same name or identifier is previously set. This is because it is inconvenient for a user to set a name of a storage area to perform a scanning operation, and thus it is more useful that each of the digital MFPs has a storage area having a previously set name such as "A", "B", "C", or "Z".

In the above-described conventional method, the work flow F is performed and the electronic document is stored in the storage area A. Here, the storage area has the same name "storage area A", but the storage area A of the digital MFP M and the storage area A of the digital MFP N are different storage areas. Thus, even if the storage area A of the digital MFP M has been protected by a password, the storage area A of the digital MFP N may not be protected in the same way.

Accordingly, if the storage area A of the digital MFP N is not protected by a password, the user who performs the work flow F on the digital MFP N may store the document data without noticing that the storage area A is not protected by a password.

This is because in the case where an electronic document is stored in a storage area of a storage device in a digital MFP, a password may not be checked even when a password has been set to the storage area.

Japanese Patent Application Laid-Open No. 2003-271562 discusses a method for storing an electronic document in a storage device while securing sufficient security and user operability by using a work flow. In the method discussed in Japanese Patent Application Laid-Open No. 2003-271562, in executing a work flow, a work flow execution unit determines that the user has a right to perform the work flow using a document only if a user has an access right to the document stored in a storage area. On the other hand, if a user does not have an access right to the document stored in a storage area, the work flow execution unit determines that the user does not have a right to access a document stored in a storage area.

However, as described above, in the case where a storage area is not protected by a password and thus any user can access the storage area, if a user performs a work flow for storing a document in the storage area without any authentication, the following problem may occur.

That is, an electronic document can be stored in a storage area where a specific setting (e.g., setting of a password) has not been registered or has been registered, contrary to an intention of a user having defined the work flow or a user desiring to perform the work flow.

SUMMARY OF THE INVENTION

An embodiment of the present invention is directed to an image processing apparatus configured, in performing a processing flow, to prevent storing an electronic document in a storage area in which a specific setting is not registered or in a storage area in which a specific setting is registered, contrary to an intention of a user having defined the processing flow or a user desiring to perform the processing flow.

According to an aspect of the present invention, an image processing apparatus includes a receiving unit configured to receive a processing flow, which is to be performed by the image processing apparatus. The received processing flow may include processing for storing data in a storage unit of the image processing apparatus. Additionally, an access control may be set to the received processing flow. The image processing apparatus further includes an instruction unit configured to instruct the processing according to the processing flow received by the receiving unit, and a storage unit configured to store data. In cases where an access control has been set to the received processing flow, a control unit of the image processing apparatus is configured, in performing the processing based on the processing flow according to the instruction given by the instruction unit, to perform the processing for storing data in the storage unit when the storage unit is under an access control, and to notify a user that the storage unit is not under the access control when the storage unit is not under the access control.

According to another aspect of the present invention, an image processing apparatus includes a receiving unit configured to receive a processing flow, which is to be performed by the image processing apparatus, that includes processing for storing data in a storage unit to which an access control has not been set, an instruction unit configured to instruct the processing according to the processing flow received by the receiving unit, a storage unit configured to store data, and a control unit configured, in performing the processing based on the processing flow according to the instruction given by the instruction unit, to perform the processing when the storage unit is not under an access control, and to notify a user that the storage unit is under the access control when the storage unit is under the access control.

According to yet another aspect of the present invention, an image processing apparatus includes a receiving unit configured to receive a processing flow, which is to be performed by the image processing apparatus, that includes processing for storing data in a storage unit in which a specific setting has been registered, an instruction unit configured to instruct the processing according to the processing flow received by the receiving unit, a storage unit configured to store data, and a control unit configured, in performing the processing based on the processing flow according to the instruction given by the instruction unit, to perform the processing when the specific setting is registered in the storage unit, and to notify a user that the specific setting is not registered in the storage unit when the specific setting is not registered in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 9 illustrates an example of work flow data defined in a file that stores a work flow according to an exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Figure 1:
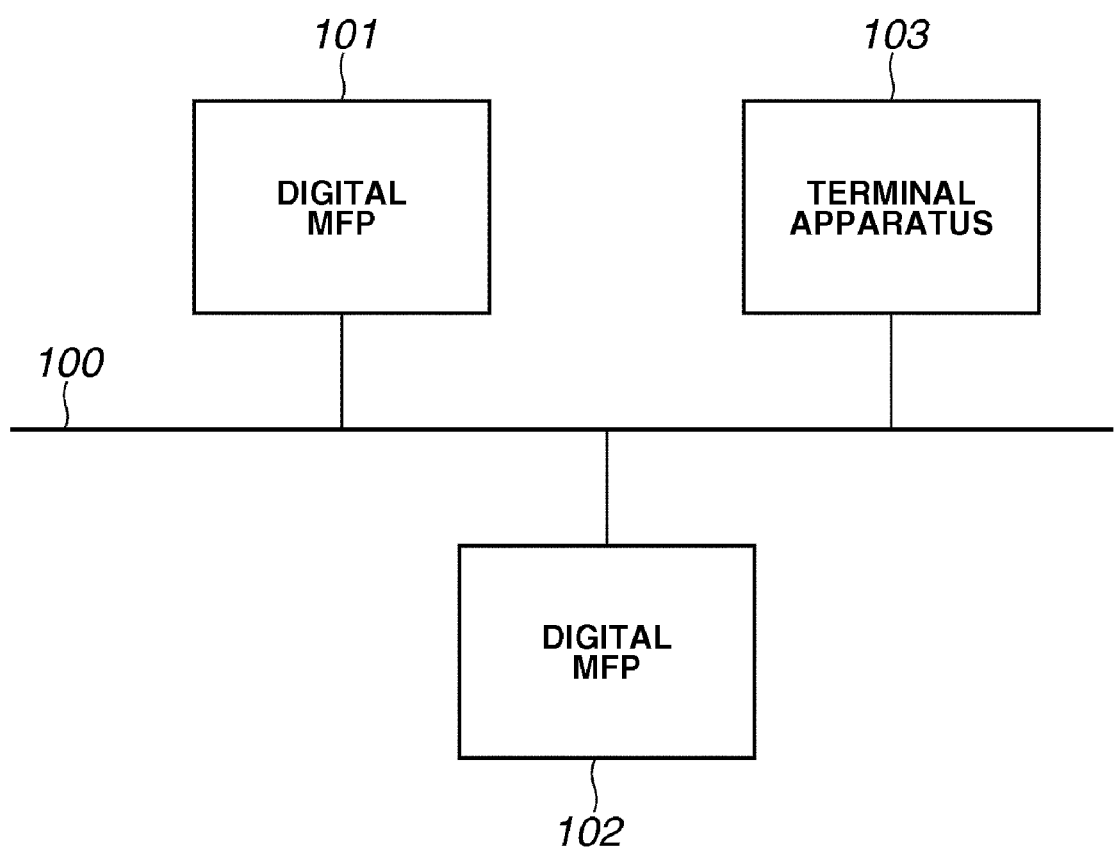
FIG. 1 illustrates an example of a configuration of an image processing system according to an exemplary embodiment of the present invention.

Now, a first exemplary embodiment of the present invention will be described below. FIG. 1 illustrates an example of a configuration of an image processing system according to the present exemplary embodiment.

In an image processing system illustrated in FIG. 1, digital MFPs 101 and 102, which are an image processing apparatus, and a terminal apparatus 103, which is an information processing apparatus, are in communication with one another via a network 100.

In the present exemplary embodiment, the digital MFPs 101 and 102 are described as an example of an image processing apparatus. However, a printer, a copying machine, a scanner, or a facsimile apparatus can also be used as the image processing apparatus. The terminal apparatus 103 (i.e., an information processing apparatus) is, for example, a personal computer (PC) or a work station.

Figure 2:
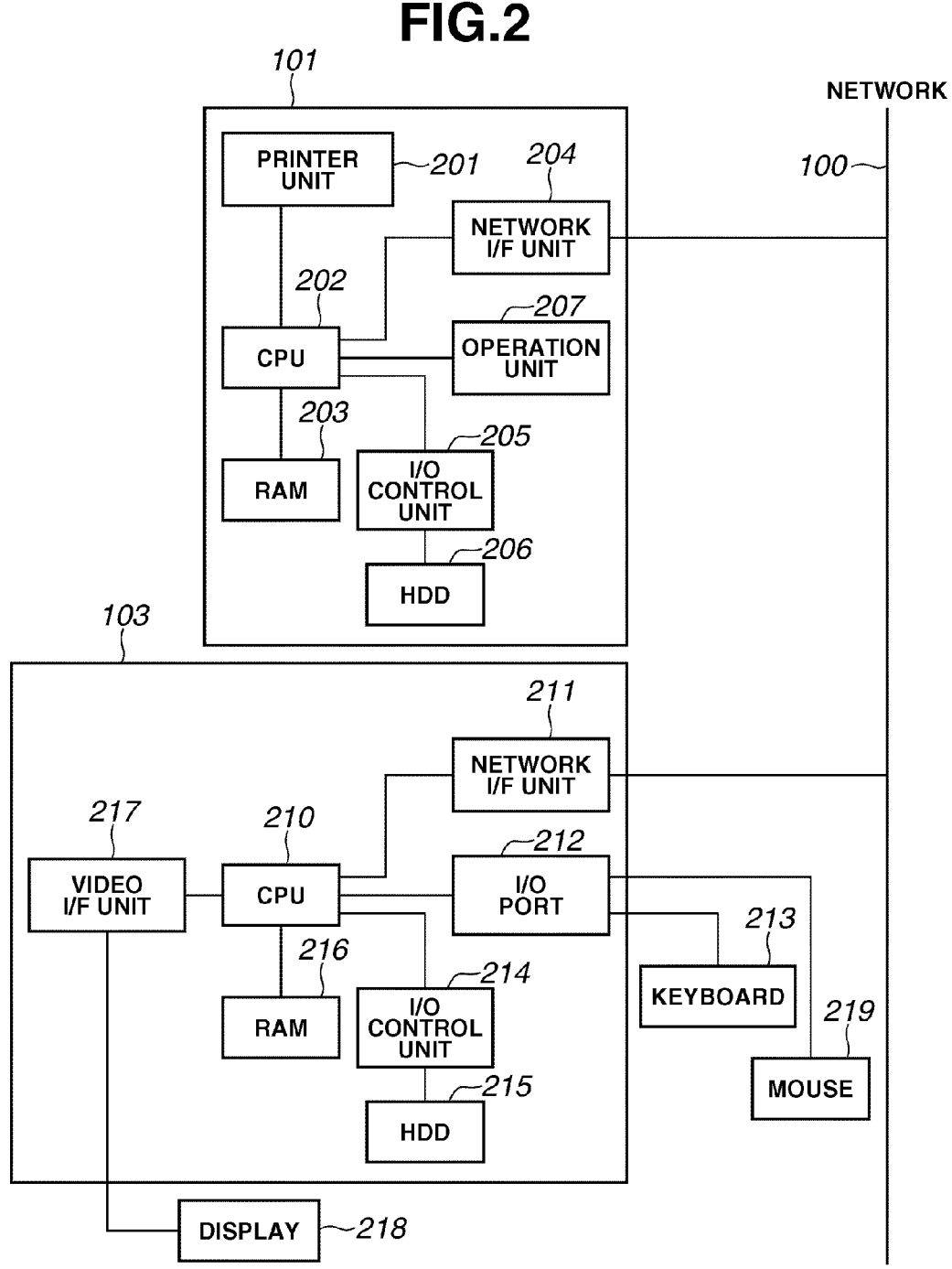
FIG. 2 illustrates an example of an inner configuration of a digital MFP and a terminal apparatus according to an exemplary embodiment of the present invention.

FIG. 2 illustrates an example of an inner configuration of the digital MFPs 101 and 102 and the terminal apparatus 103 according to the present exemplary embodiment.

Referring to FIG. 2, the digital MFP 101 includes a printer unit 201, a central processing unit (CPU) 202, a random access memory (RAM) 203, a network interface (I/F) unit 204, an operation unit 207, an input/output (I/O) control unit 205, and a storage device (hard disk drive (HDD)) 206. The CPU 202 reads a program stored on the HDD 206, which is connected via the I/O control unit 205, and executes the read program. In addition, the CPU 202 controls the printer unit 201 to perform a print job.

The digital MFP 101 is connected to the network 100 via the network I/F 204. Thus, the digital MFP 101 can communicate with the terminal apparatus 103 via the network 100.

The terminal apparatus 103 includes a CPU 210, a RAM 216, a network I/F unit 211, an I/O port 212, an I/O control unit 214, an HDD 215, and a video I/F unit 217. In addition, a keyboard 213 and a mouse 219 are connected to the terminal apparatus 103 via the I/O port 212 and a display 218 is connected to the terminal apparatus 103 via the video I/F unit 217. The CPU 210, the network I/F unit 211, the I/O port 212, the I/O control unit 214, the HDD 215, the RAM 216, and the video I/F unit 217 are in communication with each other via a system bus (not illustrated).

The CPU 210 reads and executes a program stored on the HDD 215 and loaded on the RAM 216.

The digital MFP 102 has an inner configuration similar to that of the digital MFP 101. Accordingly, the digital MFP 102 is not illustrated in FIG. 2.

Figure 3:
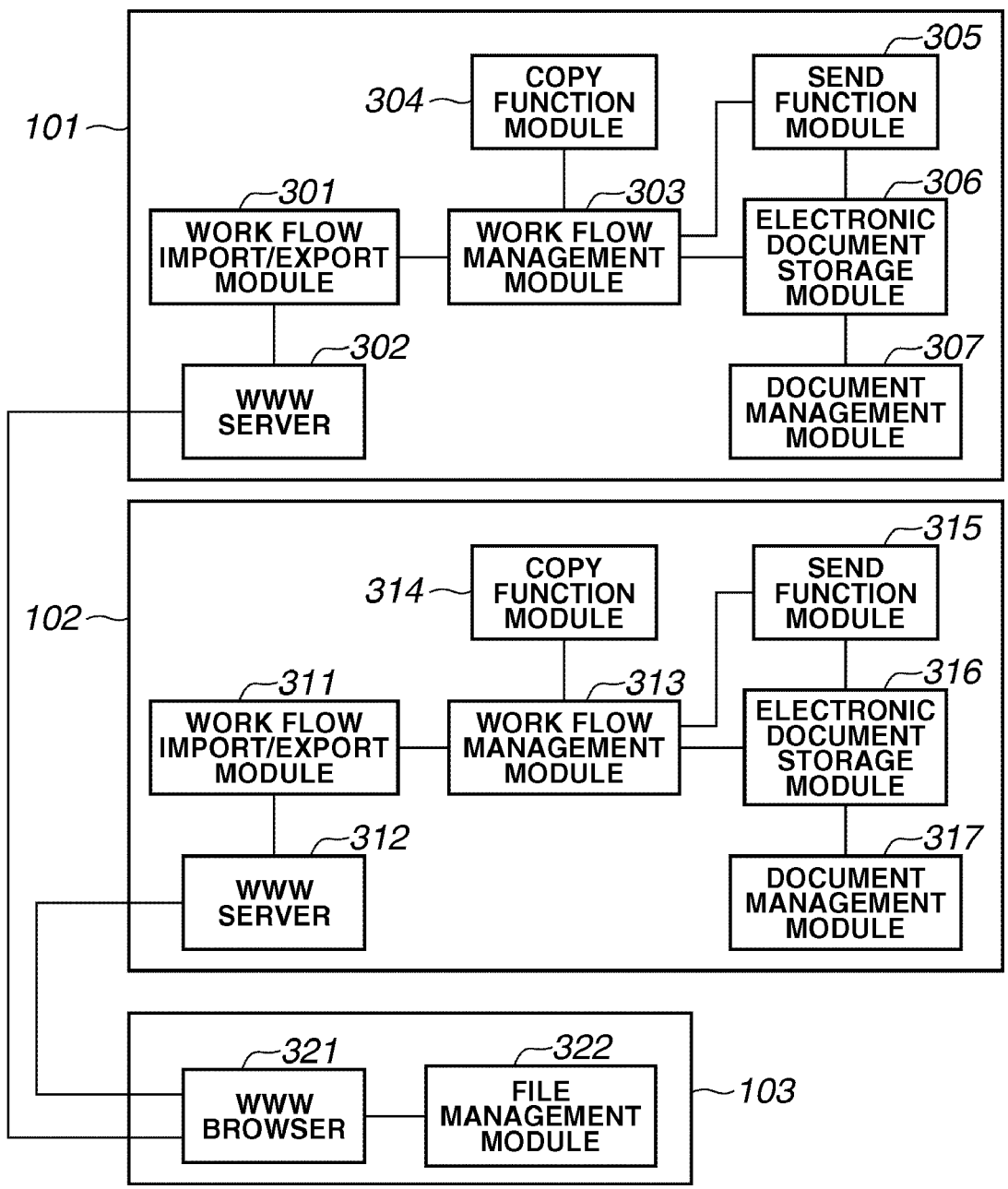
FIG. 3 illustrates exemplary modules (programs) installed on two digital MFPs and the terminal apparatus according to an exemplary embodiment of the present invention.

In the terminal apparatus 103, a WWW browser 321 illustrated in FIG. 3 is stored on the HDD 215. The WWW browser 321 is loaded on the RAM 216 by a user operation, and is executed by the CPU 210.

Furthermore, in the digital MFPs 101 and 102, a WWW server, a work flow execution program, and a document management program stored on the HDD 206 is loaded on the RAM 203, and executed by the CPU 202. A relationship among modules of the work flow execution program and the document management program will be described in detail below with reference to FIG. 3.

The WWW browser 321 executed by the CPU 210 acquires an address or a name of the digital MFP 101 or the digital MFP 102, as designated by a user and connects with the WWW server executed by the CPU 202 via the network I/F 204 and the network I/F unit 211 to perform data communication via the network 100. In the data communication, HyperText Transport Protocol (HTTP) can be used as a communication protocol.

The WWW browser 321 of the terminal apparatus 103 is capable of accessing the WWW server of the digital MFP 101 or the digital MFP 102 by the HTTP protocol, sending a request to a work flow export program executed by the WWW server, and extracting a work flow from the work flow export program as a file.

In addition, the WWW browser 321 of the terminal apparatus 103 sends a request and the exported file to a work flow import program executed by the WWW server of the digital MFP 101 or the digital MFP 102. Thus, the WWW server of the terminal apparatus 103 can import a work flow file. A relationship among the programs will be described in detail below with reference to FIG. 3.

FIG. 3 illustrates each module (program) installed on the digital MFP 101, the digital MFP 102, and the terminal apparatus 103 according to the present exemplary embodiment. The modules are programs read from the HDD 206 of the digital MFP 101 or the digital MFP 102 or the HDD 215 of the terminal apparatus 103, as described above with reference to FIG. 2. The modules are executed by the CPU 202 of the digital MFP 101 or the digital MFP 102 or the CPU 210 of the terminal apparatus 103. Hereinbelow, the operation of each of the modules will be described.

Referring to FIG. 3, the digital MFP 101 includes a work flow import/export module 301, a WWW server 302, a work flow management module 303, a copy function module 304, a send function module 305, an electronic document storage module 306, and a document management module 307.

The digital MFP 102 includes a work flow import/export module 311, a WWW server 312, a work flow management module 313, a copy function module 314, a send function module 315, an electronic document storage module 316, and a document management module 317.

The terminal apparatus 103 includes the WWW browser 321 and a file management module 322.

Each of the digital MFP 101 and the digital MFP 102 can perform data communication with the WWW browser 321 of the terminal apparatus 103 via the network 100 by the HTTP protocol, using the WWW server 302 and the WWW server 312, as illustrated in FIG. 3.

The work flow import/export module 301 of the digital MFP 101 and the work flow import/export module 311 of the digital MFP 102 each can access the work flow management module 303 and the work flow management module 313. The work flow import/export module 301 and the work flow import/export module 311 can be accessed from the WWW server 302 and the WWW server 312.

For example, when a user designates a uniform resource locator (URL) of the work flow import/export module 301 via the WWW browser 321 of the terminal apparatus 103 to send a request for accessing the WWW server 302, the request is transferred to the work flow import/export module 301. Then, the work flow import/export module 301 sends a reply to the access request to the WWW browser 321 via the WWW server 302.

Hereinbelow, an operation for exporting a work flow performed by the work flow import/export module 301 will be described.

When a request for exporting a work flow is sent from the WWW browser 321 to the work flow import/export module 301, the work flow import/export module 301 instructs the work flow management module 303 to transfer the work flow to the work flow import/export module 301.

Then, the work flow management module 303 transfers work flow data, which is internally managed by the work flow management module 303, to the work flow import/export module 301. The work flow import/export module 301 receives the work flow data, stores the received work flow data in a work flow file having a predetermined file format, and then sends to the WWW browser 321 the stored work flow file as a reply.

The WWW browser 321 receives the work flow as a file and stores the received work flow file on the terminal apparatus 103 via the file management module 322.

The work flow import/export module 311 also performs the above-described operation. Accordingly, a description thereof will not be repeated here.

Now, an operation for importing a work flow performed by the work flow import/export module 311 will be described below.

The CPU 202 sends a request for importing the work flow from the WWW browser 321 to the work flow import/export module 311 together with a work flow file. Then, the work flow import/export module 311 receives the work flow file and reads the received workflow file to acquire the workflow data. Then, the work flow management module 313 stores the acquired work flow data as a work flow file.

The work flow management module 313 sends a result of the above-described processing to the work flow import/export module 311. Then, the work flow import/export module 311 sends the result to the WWW browser 321.

The work flow management module 303 of the digital MFP 101 and the work flow management module 313 of the digital MFP 102 can register a work flow. The operation for registering a work flow performed by the work flow management module 303 or the work flow management module 313 will be described below with reference to FIGS. 4, 5, 6, 7, and 8. In addition, the work flow management module 303 and the work flow management module 313 can access the copy function module 304 or the copy function module 314, the send function module 305 or 315, and the electronic document storage module 306 or the electronic document storage module 316.

That is, for example, the work flow management module 303, at the time of executing the work flow data, instructs the copy function module 304 to perform a copy operation according to a setting regarding the copy function held in the work flow data if the work flow data includes a definition for performing the copy operation.

Similarly, if the work flow data includes definition for performing a send operation, the work flow management module 303 instructs the send function module 305 to perform the send operation. In addition, if the work flow data includes definition for performing a document storage operation, the work flow management module 303 instructs the electronic document storage module 306 to store the document.

Figure 10:
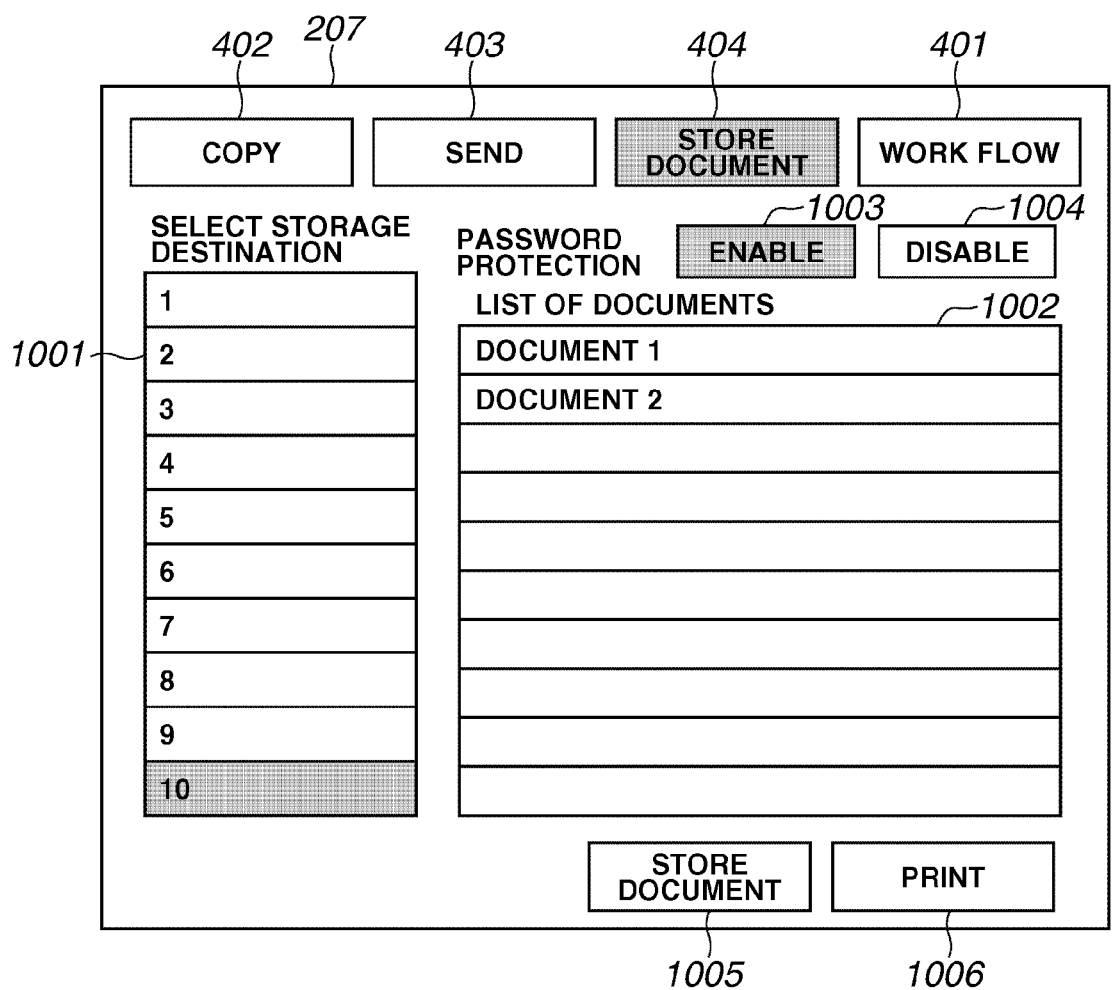
FIG. 10 illustrates an example of a screen for performing a setting for the document storage function provided by an electronic document storage module of the digital MFP, according to an exemplary embodiment of the present invention.

FIG. 10 illustrates an example of a screen for executing the document storage function provided by the electronic document storage module 306 of the digital MFP 101 according to the present exemplary embodiment. The screen in FIG. 10 is displayed on a touch panel screen of the operation unit 207 of the digital MFP 101.

Referring to FIG. 10, a storage destination list 1001 describes a storage destination number previously set to the digital MFP 101. A plurality of storage destinations is previously prepared in the digital MFP 101, each of which is provided with a unique number. That is, the user can designate a storage destination by entering the unique number for the desired storage destination to store a document therein.

Generally, a digital MFP has a storage device having a smaller storage capacity than a storage device of a general-purpose PC. Further, the digital MFP is shared as a business apparatus. Thus, in most cases, the user previously selects the capacity of the entire document to be stored and the storage destination thereof within a predetermined range. In the present exemplary embodiment, storage destinations 1 through 10 are provided for sake of simplicity. In the example illustrated in FIG. 10, the user has selected the storage destination 10.

A document list 1002 describes a list of documents stored in the storage destination 10 that has been selected by the user. In the example illustrated in FIG. 10, a document 1 and a document 2 are stored in the storage destination 10.

A document storage button 1005 can be operated by a user to scan a paper document and store an electronic document obtained by the scanning. In the example illustrated in FIG. 10, when the user presses the document storage button 1005, the digital image obtained by scanning the paper document is stored in the storage destination 10.

A print button 1006 can be operated by a user to print out a document selected by the user from among the documents listed in the document list 1002. When the user presses the print button 1006, the electronic document selected from among the documents listed in the document list 1002 can be printed out.

A button 1003 can be operated by a user to enable a password protection of the storage destination 10, which has been selected from among the storage destinations listed in the storage destination list 1001. A button 1004 can be operated by a user to disable the password protection of the selected storage destination. In the example illustrated in FIG. 10, the password protection of the storage destination 10 has been enabled.

Figure 11:
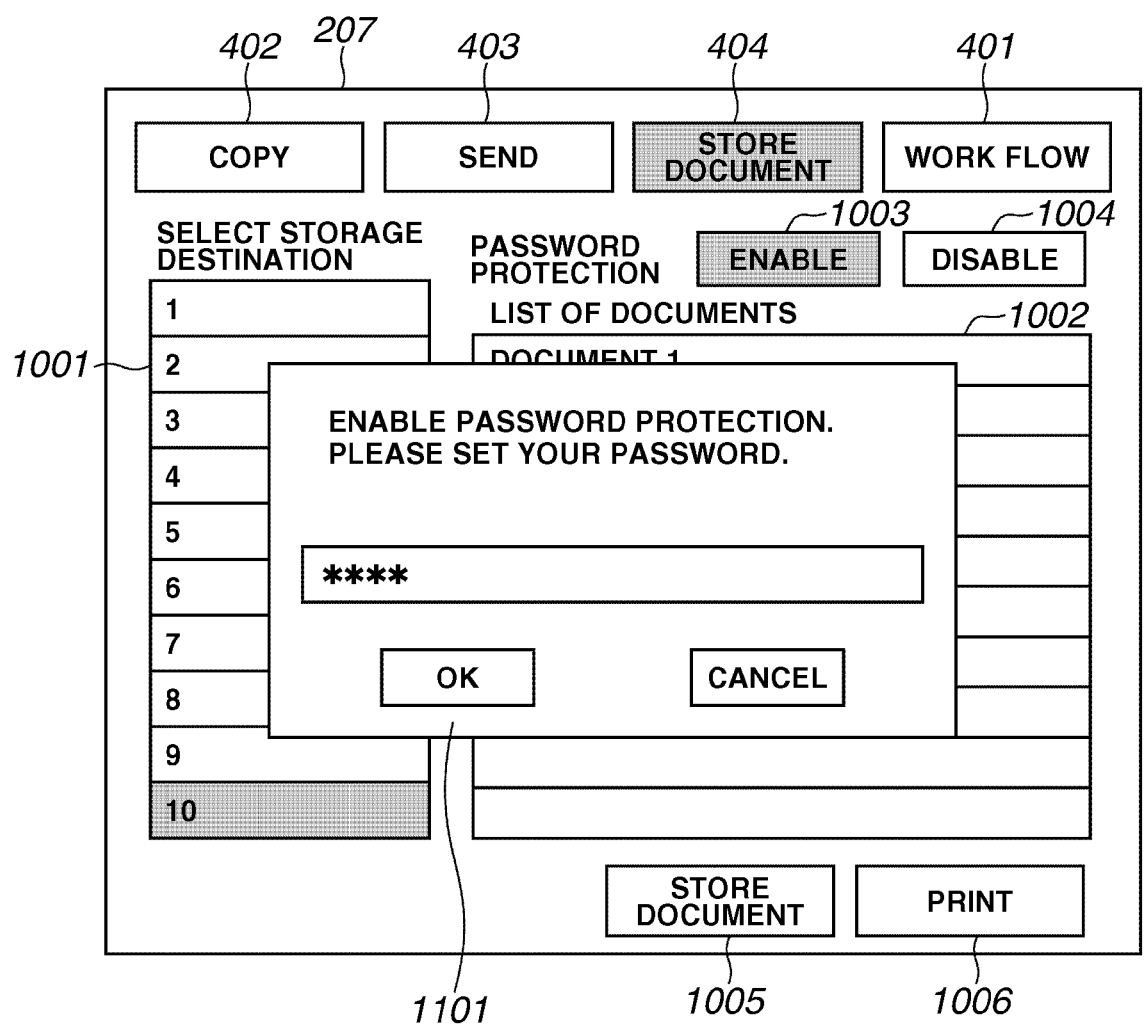
FIG. 11 illustrates an example of a screen for performing a change of a password provided by the electronic document storage module of the digital MFP according to an exemplary embodiment of the present invention.

The password can be changed as necessary. When the user presses the button 1003 again, the screen shifts to a screen illustrated in FIG. 11. The user can set a new password by entering the new password via a dialog box 1101 (FIG. 11). Hereinbelow, in the example in FIG. 11, the password is described as "**", which indicates that a password "1234" is set for the storage destination 10**.

In this case, when the user selects the storage destination 10 from among the storage destinations listed in the storage destination list 1001, a password input screen is displayed. Unless the user enters the password "1234" via numeral keys of the operation unit 207, the document list 1002 is not displayed.

Figure 4:
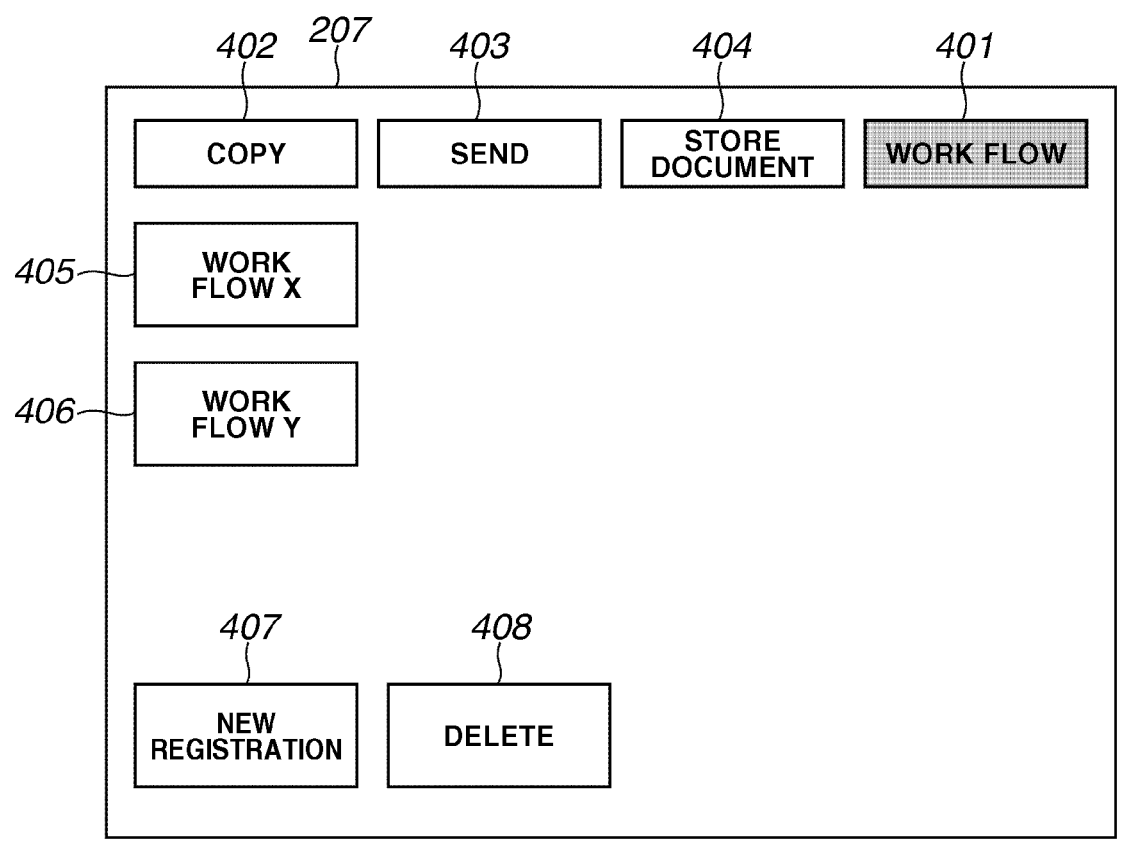
FIG. 4 illustrates an example of a screen for executing and registering a work flow on the digital MFP according to an exemplary embodiment of the present invention.

FIG. 4 illustrates an example of a screen for performing and registering a work flow in the digital MFP 101 according to the present exemplary embodiment. The screen illustrated in FIG. 4 is displayed according to the function provided by the workflow management module 303. The registered work flow is stored by the work flow management module 303 in the digital MFP 101 as a work flow file.

Referring to FIG. 4, a copy button 402 can be operated by a user to start a copy function. A send button 403 can be operated by a user to start a send function. A document storage button 404 can be operated by a user to start a document storage function.

Here, the copy function refers to a function for copying a paper document with the digital MFP 101. The send function refers to a function for sending an electronic document generated by scanning a paper document with the digital MFP 101 by various sending methods such as facsimile transmission or e-mail. A document storage function refers to a function for storing in the digital MFP 101 the electronic document generated by scanning a paper document with the digital MFP 101 and printing the stored electronic document with the digital MFP 101.

A work flow menu button 401 can be operated by a user to start the work flow function. When the user presses the work flow menu button 401, a work flow execution and registration menu is displayed.

A work flow X button 405 corresponds to a work flow X, which has already been registered. A work flow Y button 406 corresponds to a work flow Y, which has also been registered. The user previously registers a plurality of operations in each of the work flow X button 405 and the work flow Y button 406. Just by pressing the work flow X button 405 or the work flow Y button 406 once, the user can perform the work flow X or the work flow Y, which includes a plurality of operations.

A registration button 407 can be operated by a user to define a new work flow. A delete button 408 can be operated by a user to delete a button for a defined work flow.

Hereinbelow, an operation for newly registering a work flow according to the present exemplary embodiment will be described.

Figure 5:
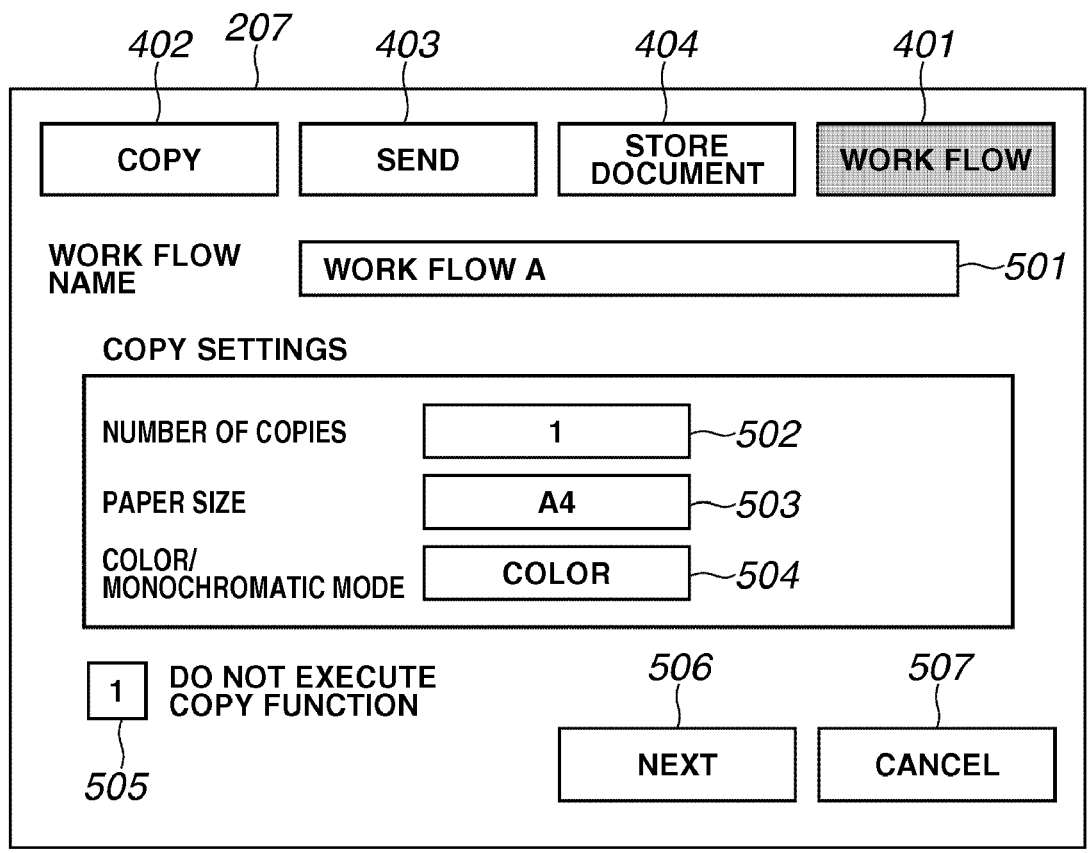
FIG. 5 illustrates an example of a screen displayed when a user has pressed a registration button via the screen illustrated in FIG. 4, according to an exemplary embodiment of the present invention.

FIG. 5 illustrates an example of a screen displayed when the user presses the registration button 407 (FIG. 4), according to the present exemplary embodiment.

Referring to FIG. 5, the user can set a work flow name to a work flow which is to be newly registered via a field 501. In the example illustrated in FIG. 5, the user has set the work flow name to be "work flow A".

Via the screen illustrated in FIG. 5, the user can perform a setting for the copy function. The user sets a number of copies via a setting field 502. The user sets a paper size via a setting field 503. The user sets a color mode (color or monochromatic) via a setting field 504.

The user can arbitrarily select whether to set a copy function in the work flow to be newly registered. In this case, the user marks a check box 505 not to set a copy function in the work flow to be newly registered.

In the example illustrated in FIG. 5, the user has not checked the check box 505. Accordingly, the copy operation is performed according to the settings performed by the user via the setting field 502, the setting field 503, and the setting field 504.

In the example illustrated in FIG. 5, only simple settings are described for sake of simplicity. However, various functions other than those described in the present exemplary embodiment can be included in the copy function, which can be set via the screen illustrated in FIG. 5.

A button 506 can be operated by a user to perform a setting for a next operation during the work flow A after having set the settings for the copy function. A button 507 can be operated by a user to cancel the once performed operation for newly registering the work flow A.

Figure 6:
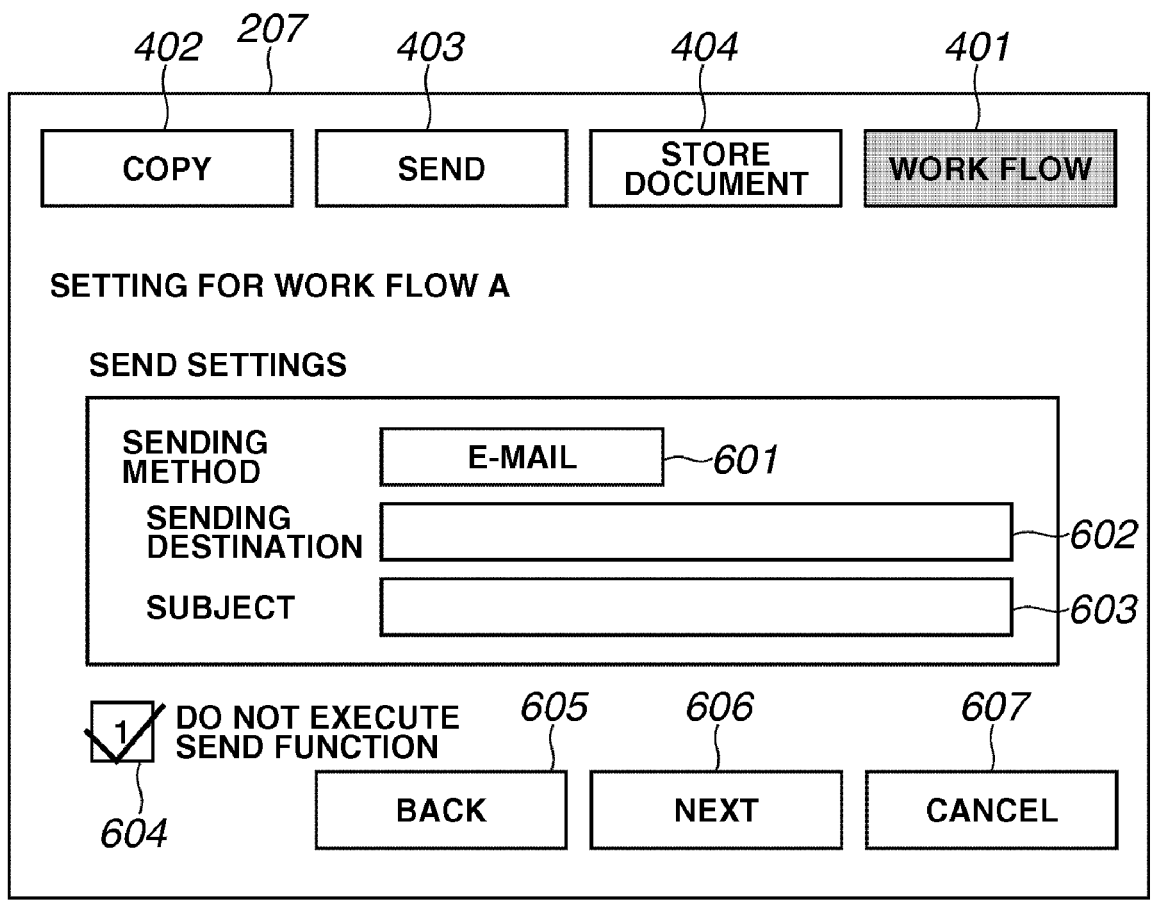
FIG. 6 illustrates an example of a screen for performing a setting for a send function according to a work flow, after the user has performed a setting illustrated in FIG. 5, according to an exemplary embodiment of the present invention.

FIG. 6 illustrates an example of a screen for performing a setting for the copy function, which is performed during the work flow A after the operation performed by the user via the screen in FIG. 5 has been completed.

Referring to FIG. 6, the user can perform a setting as to a sending method via a setting field 601. As a sending method, an e-mail transmission, a facsimile transmission, a file transfer protocol (FTP) transmission, and a transmission according to a server message block (SMB) protocol can be used.

The user can set a sending destination of an e-mail (namely, an e-mail address) via a setting field 602. The user can set a subject of an e-mail via a setting field 603.

In the example illustrated in FIG. 6, the user has selected an e-mail transmission as the sending method via the setting field 601. Accordingly, the user sets an e-mail sending destination and a subject of the e-mail via the setting field 602 and the setting field 603, respectively. However, if the user selects a sending method other than the e-mail transmission, the user sets a sending destination corresponding to the selected sending method (e.g., a phone number) via the setting field 602.

In this case, contents to be set by the user via the setting field 602 and the setting field 603 change according to the selected sending method. In addition, the number of items (fields) to be set increases or decreases. In FIG. 6, an example of sending data using an e-mail transmission is described as the sending method in the present exemplary embodiment for sake of simplicity.

The user marks a check box 604 if the user does not desire to perform the send function. In the example illustrated in FIG. 6, the user has marked the check box 604. Accordingly, the send function is not performed according to the work flow A.

A button 605 can be operated by a user to shift back to the screen illustrated in FIG. 5. A button 606 can be operated by a user to perform a setting for a next operation in the work flow A after having completed the setting for the send function. A button 607 can be operated by a user to cancel the once performed operation for newly registering the work flow A.

Figure 7:
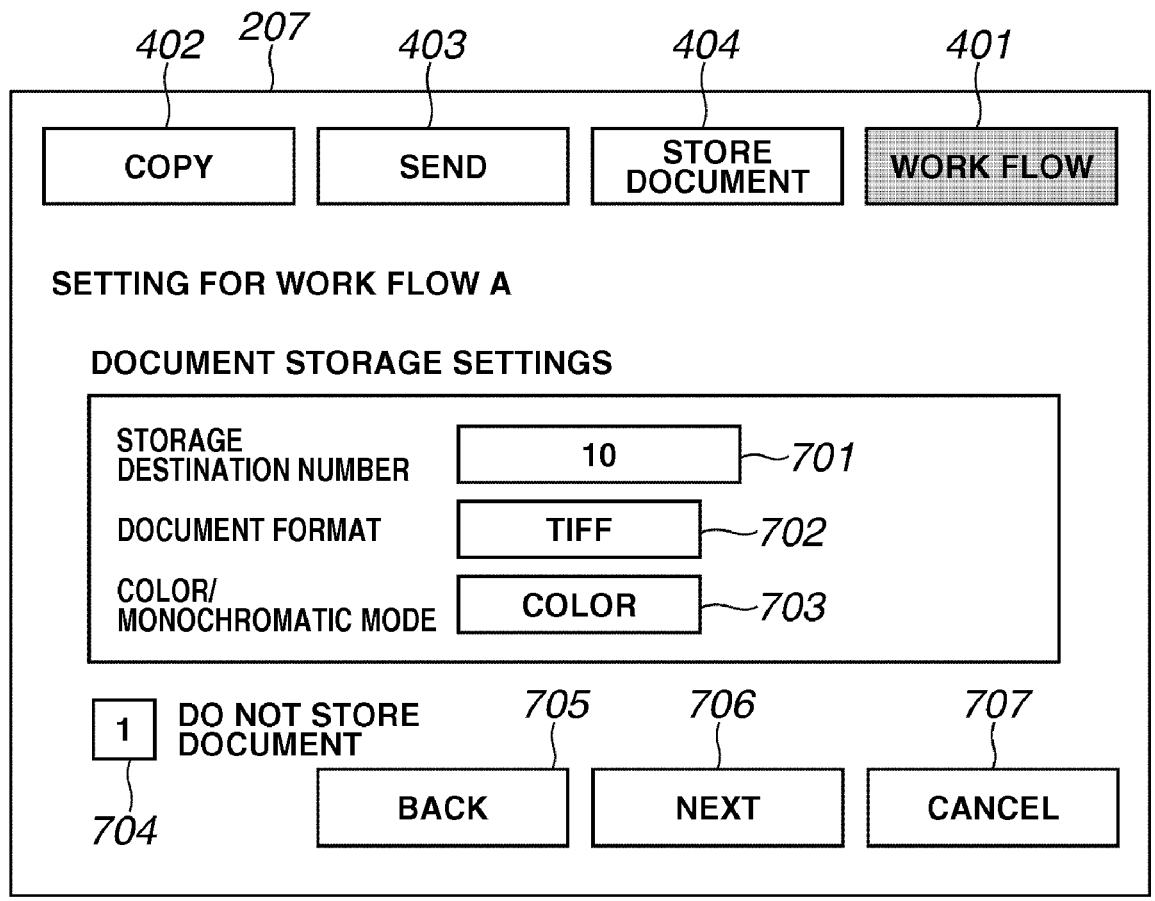
FIG. 7 illustrates an example of a screen for performing a setting for a document storage operation according to a work flow after the user has performed a setting illustrated in FIG. 6, according to an exemplary embodiment of the present invention.

FIG. 7 illustrates an example of a screen for performing a setting for the document storage operation in the work flow A after the user has completed the setting via the screen illustrated in FIG. 6.

Referring to FIG. 7, the user sets a storage destination number via a field 701. In the example illustrated in FIG. 7, the user has designated the storage destination 10 as the storage destination.

The user can designate a file format of the electronic document to be stored via a field 702. In the example illustrated in FIG. 7, the user has set a tagged image file format (TIFF) as the file format of the electronic document to be stored. The user can set a file format other than the TIFF.

The user can designate whether to store the electronic document as a color electronic document or a monochromatic electronic document via a field 703. In the example illustrated in FIG. 7, the user has selected a color document.

Here, various other settings for storing an electronic document can be performed. For example, the user can set resolution for the electronic document. However, in the present exemplary embodiment, the user performs only the above-described settings for sake of simplicity.

The user marks the check box 704 if the user does not desire to perform the document storage function. In the example illustrated in FIG. 7, the user has not marked the check box 704. Accordingly, the electronic document is stored according to the setting performed by the user via the field 701, the field 702, and the field 703.

A button 705 can be operated by a user to shift back to the send function setting screen illustrated in FIG. 6. A button 706 can be operated by a user to finish the setting for the work flow and store the performed setting. When the user presses the button 706, the work flow A is stored in the digital MFP 101. A button 707 can be operated by a user to cancel the once performed operation for newly registering the work flow A.

Now, processing for generating a work flow according to the present exemplary embodiment will be described in detail below with reference to a flow chart of FIG. 12.

Figure 12:
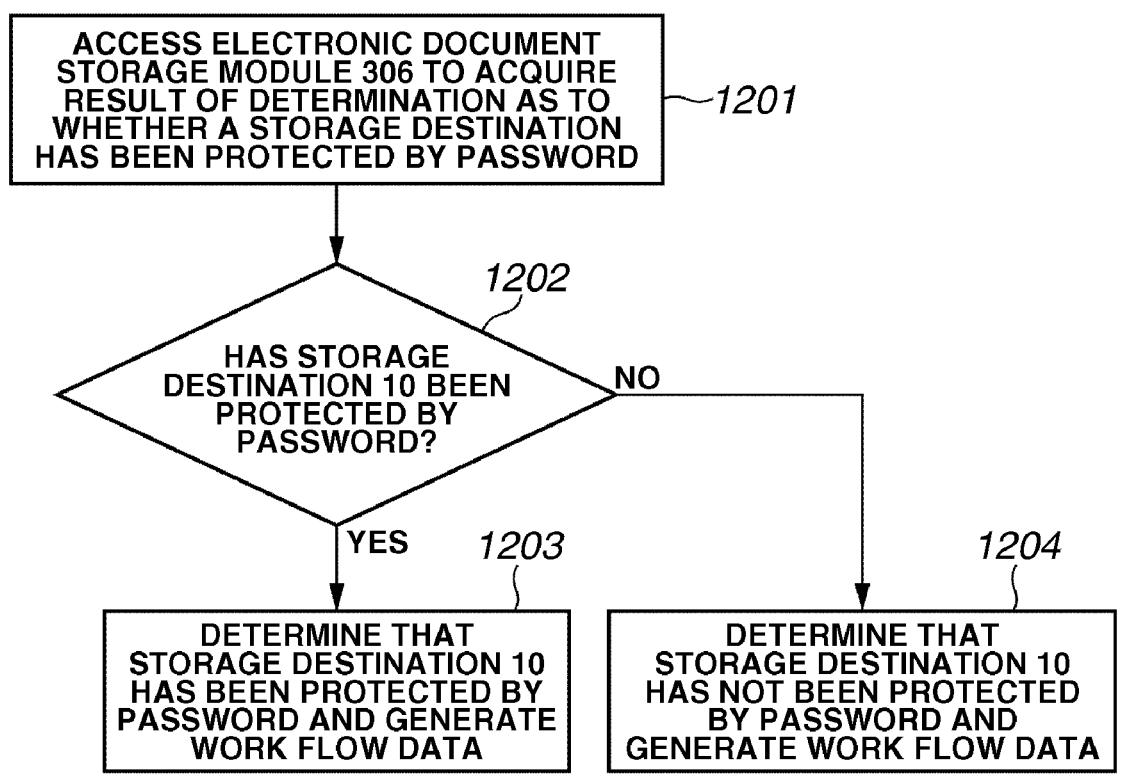
FIG. 12 illustrates an example of a screen for performing processing by the electronic document storage module of the digital MFP generating work flow data according to an exemplary embodiment of the present invention.

FIG. 12 is a flow chart illustrating processing performed by the work flow management module 303 subsequent to the above-described processing.

Referring to FIG. 12, in step S1201, the work flow management module 303 accesses the electronic document storage module 306 and issues a request to the electronic document storage module 306 for information about whether the storage destination 10 designated by the user as the sending destination via the screen in FIG. 7, is protected by a password.

In step S1202, according to the information received from the electronic document storage module 306 in step S1201, the work flow management module 303 determines whether the storage destination 10 is protected by a password. If it is determined in step S1202 that the storage destination 10 is protected by a password (YES in step S1202), then the work flow management module 303 determines that the password protection of the storage destination 10 is enabled and then advances to step S1203. In step S1203, the work flow management module 303 generates work flow data according to the determination result. On the other hand, if it is determined in step S1202 that the storage destination 10 is not protected by a password (NO in step S1202), then the work flow management module 303 determines that the password protection of the storage destination 10 is disabled and then advances to step S1204. In step S1204, the work flow management module 303 generates work flow data according to the determination result.

As described above, after performing the copy operation of the paper document, the work flow management module 303 generates and registers work flow data for the work flow A for storing the electronic document which is generated based on the scanned paper document, without sending the electronic document according to the settings performed by the user via the screens in FIGS. 5, 6, and 7. The work flow management module 303 stores the work flow data of the work flow A in the digital MFP 101 as a work flow file.

In the examples illustrated in FIGS. 5, 6, and 7, the order of performing the settings for the copy function, the send function, and the document storage function cannot be changed and accordingly, the settings for the copy, send, and document storage functions are performed in this order. However, alternatively, the order of performing the settings for these functions can be configured to change.

Figure 8:
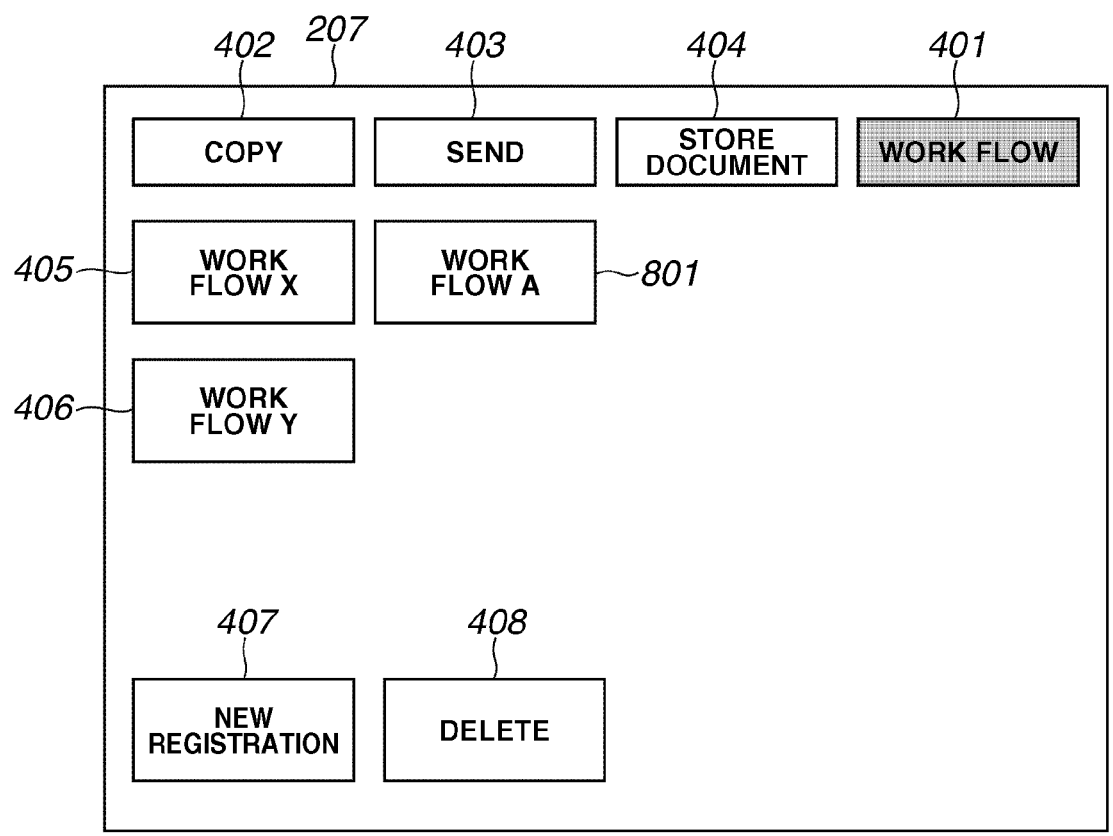
FIG. 8 illustrates an example of a screen displayed after the user has completed a registration of a work flow according to an exemplary embodiment of the present invention.

FIG. 8 illustrates an example of a screen displayed after the work flow management module 303 has registered the work flow A.

Referring to FIG. 8, the user can press a work flow A button 801 to designate the work flow A.

FIG. 9 illustrates an example of work flow data defined in the work flow file that stores the work flow A according to the present exemplary embodiment.

In the example illustrated in FIG. 9, the work flow data is described in an Extensible Markup Language (XML). However, the work flow data can be described according to a format other than the XML format. Furthermore, the work flow data can be a file other than a file having data as text strings (text data).

Referring to FIG. 9, the work flow data defined in the work flow file includes data corresponding to the work flow data generated based on the settings performed by the user via the screens illustrated in FIGS. 5, 6, and 7 and the result of the determination in step S1202 (FIG. 12) is described. In the example illustrated in FIG. 9, descriptions are surrounded by rectangles, which are to discriminate each description. Actual data does not include the rectangles.

In the example illustrated in FIG. 9, data 901 describes a number of copies set for the copy operation (via the setting field 502 of FIG. 5). Data 902 describes a paper size set for the copy operation (via the setting field 503 of FIG. 5). Data 903 describes a color mode set for the copy operation (via the setting field 504 of FIG. 5). Data 904 describes a storage destination number set for the document storage operation (via the setting field 701 of FIG. 7). Data 905 describes a file format set for the document storage operation (via the setting field 702 of FIG. 7). Data 906 describes a color mode set for the document storage operation (via the setting field 703 of FIG. 7). Data 907 describes information about whether a password has been set to a storage destination, which has been acquired in step S1201 (FIG. 12).

In the example illustrated in FIG. 9, a number of the password is not included in the data to ensure security.

Figure 13:
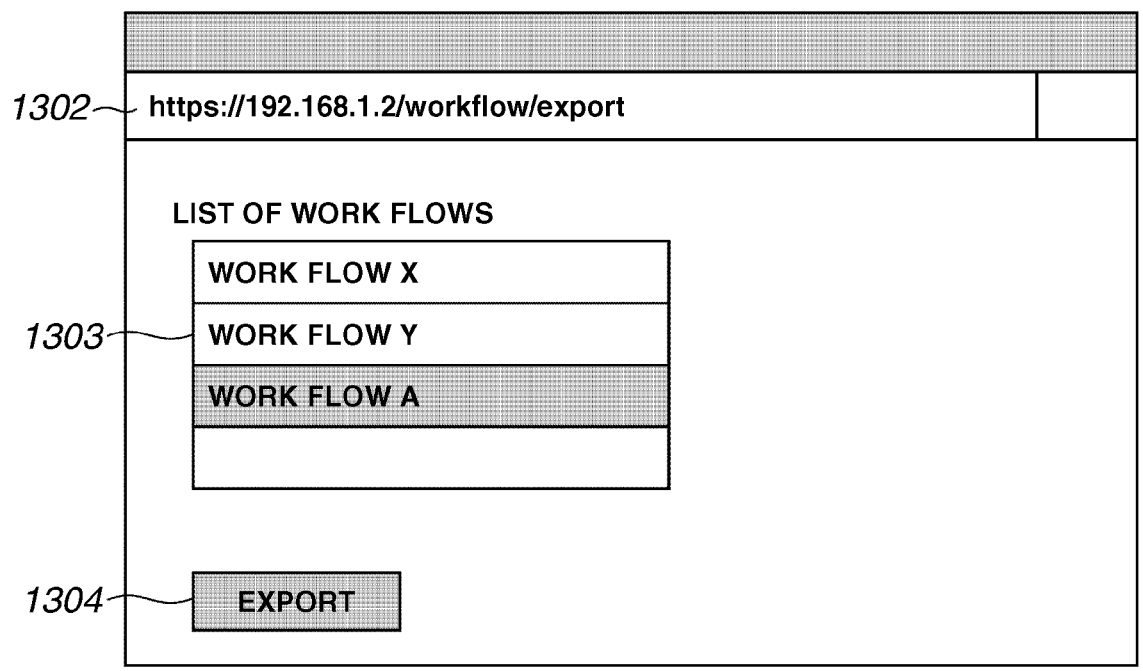
FIG. 13 illustrates an example of a screen displayed when a World Wide Web (WWW) browser of the terminal apparatus accesses an export page displayed according to a function of a work flow import/export module of the digital MFP, according to an exemplary embodiment of the present invention.

FIG. 13 illustrates an example of a screen displayed when the WWW browser 321 of the terminal apparatus 103 accesses an export page displayed according to the function of the work flow import/export module 301 of the digital MFP 101.

Referring to FIG. 13, a field 1302 describes a URL of the export page of the work flow import/export module 301. A work flow list 1303 describes a list of work flows held by the work flow management module 303 in the digital MFP 101.

The work flow import/export module 301 requests to the work flow management module 303 for a work flow list. Then, the work flow import/export module 301 acquires a work flow list from the work flow management module 303. The work flow import/export module 301 sends the received work flow list to the WWW browser 321 via the WWW server 302.

An export button 1304 can be operated by a user to acquire the work flow file selected from among the work flows listed in the work flow list 1303.

The WWW browser 321 of the terminal apparatus 103 accesses the work flow import/export module 301 via the WWW server 302 to request the work flow import/export module 301 to send the work flow file including the work flow selected by the user from among the work flows listed in the work flow list 1303 (in the example illustrated in FIG. 13, the work flow A is selected). Then, the WWW browser 321 acquires a work flow file from the work flow import/export module 301. The WWW browser 321 stores the acquired work flow file in the terminal apparatus 103.

It is not essential which work flow file stores the acquired work flow file in what manner in the terminal apparatus 103. Accordingly, a description thereof is omitted here.

Hereinbelow, processing for importing the work flow A, which has been acquired from the digital MFP 101, into the digital MFP 102 and for performing the imported work flow A will be described with reference to FIG. 14.

Figure 14:
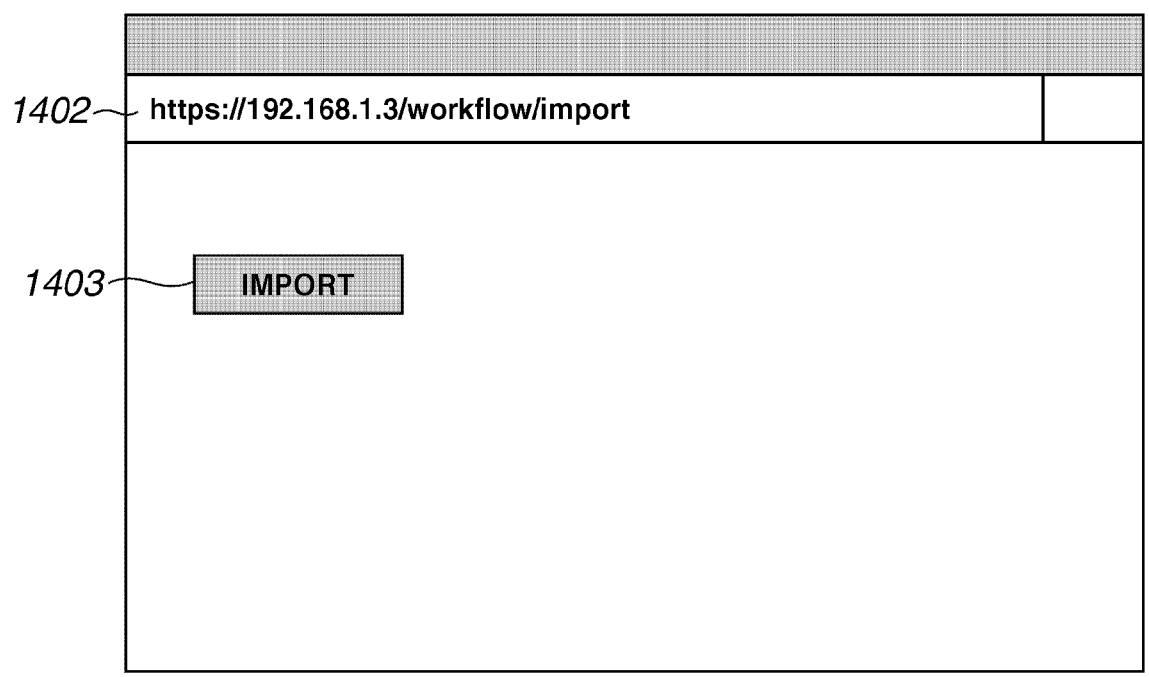
FIG. 14 illustrates an example of a screen displayed when the WWW browser of the terminal apparatus accesses an import page displayed according to a function of the work flow import/export module of the digital MFP, according to an exemplary embodiment of the present invention.

FIG. 14 illustrates an example of a screen displayed when the WWW browser 321 of the terminal apparatus 103 accesses an import page displayed according to the function of the work flow import/export module 311 of the digital MFP 102.

Referring to FIG. 14, a field 1402 describes a URL of the export page of the work flow import/export module 311. An import button 1403 can be operated by a user to designate a work flow file from among the work flow files held in the terminal apparatus 103 and import the designated work flow file to the digital MFP 102.

The user designates the work flow file stored by the user operation via the screen in FIG. 13. Then, the CPU 210 of the digital MFP 102 requests the work flow import/export module 311 to export the designated work flow via the WWW server 312.

The work flow import/export module 311 transfers the work flow data of the work flow A defined in the received work flow file to the work flow management module 313. The work flow management module 313, having received the work flow data of the work flow A, stores the received work flow data of the work flow A in the digital MFP 102.

Figure 15:
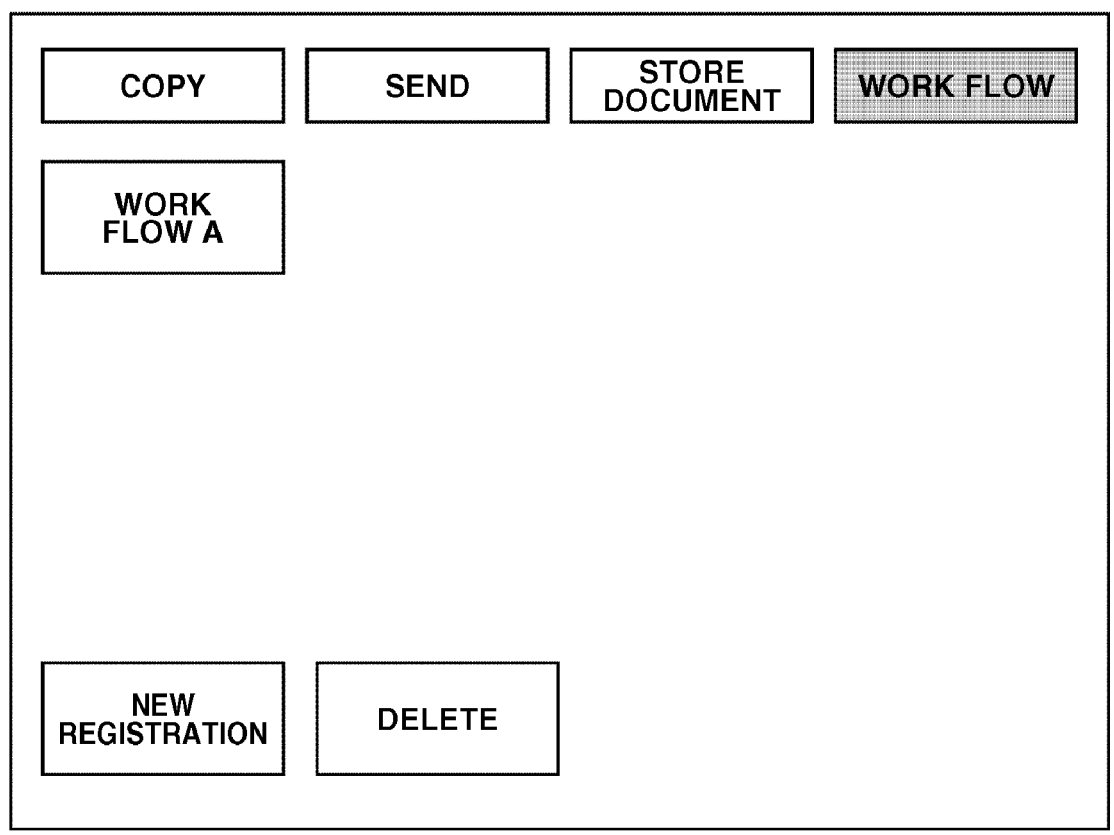
FIG. 15 illustrates an example of a screen for performing and registering a work flow on the digital MFP according to an exemplary embodiment of the present invention.

FIG. 15 illustrates an example of a screen for performing and registering a work flow on the digital MFP 102 according to the present exemplary embodiment. The screen illustrated in FIG. 15 is displayed by the work flow management module 313. A basic configuration of the screen in FIG. 15 is similar to the screen described above with reference to FIG. 4. Accordingly, a detailed description thereof is not repeated here. In the example illustrated in FIG. 15, the work flow A, which has been imported by the user operation via the screen in FIG. 14, is illustrated.

Figure 16:
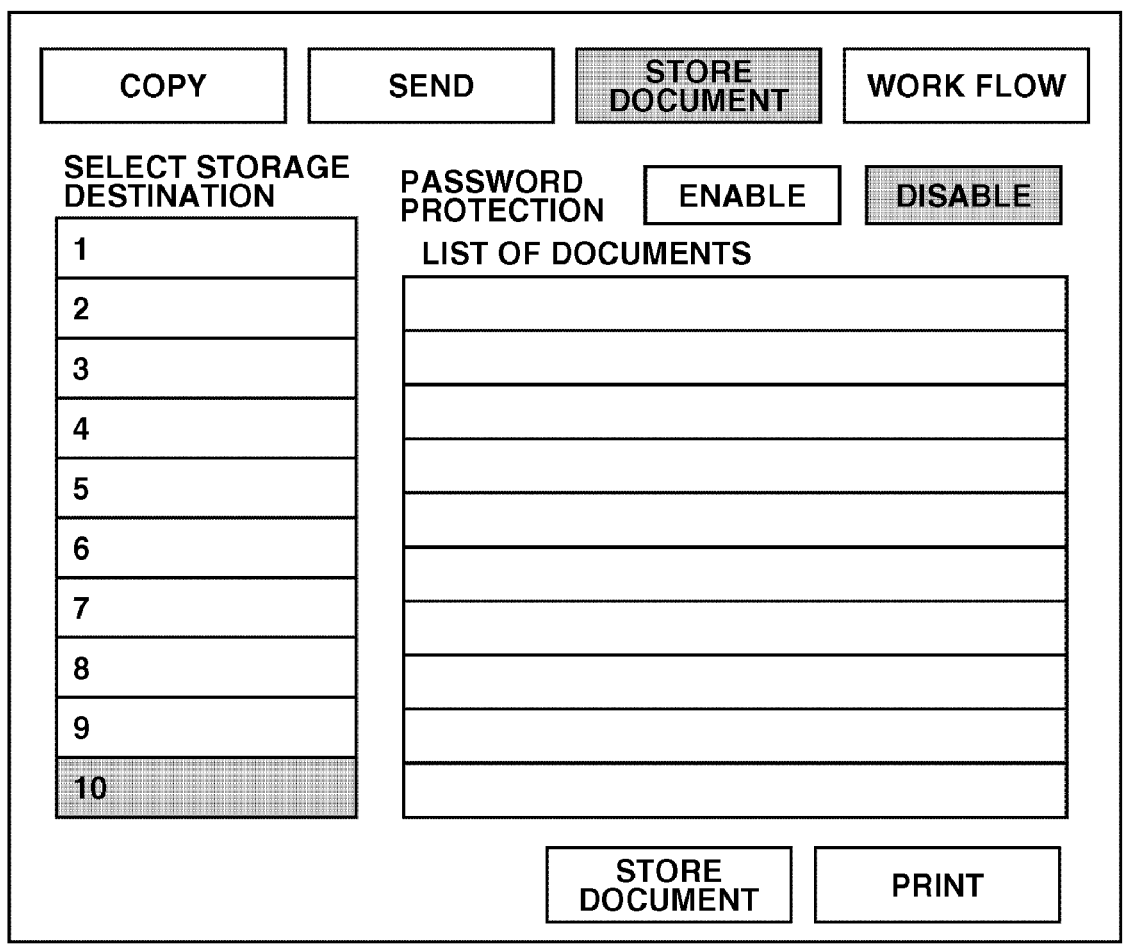
FIG. 16 illustrates an example of a screen for performing a setting for a document storage function of the electronic document storage module of the digital MFP according to an exemplary embodiment of the present invention.

FIG. 16 illustrates an example of a screen for performing a setting for the document storage function of the electronic document storage module 316 of the digital MFP 102. A basic configuration of the screen in FIG. 16 is similar to the screen described above with reference to FIG. 10. Accordingly, a detailed description thereof is not repeated here. In the example illustrated in FIG. 16, the password protection of the storage destination 10 is disabled by the user operation of a button 1607. That is, the state of password protection of the storage destination 10, which is a setting for the security in terms of the storage destination, differs depending on the digital MFP 101 and the digital MFP 102, even if the electronic document has been designated to be stored in the storage destination having the same storage destination number "10".

Figure 17:
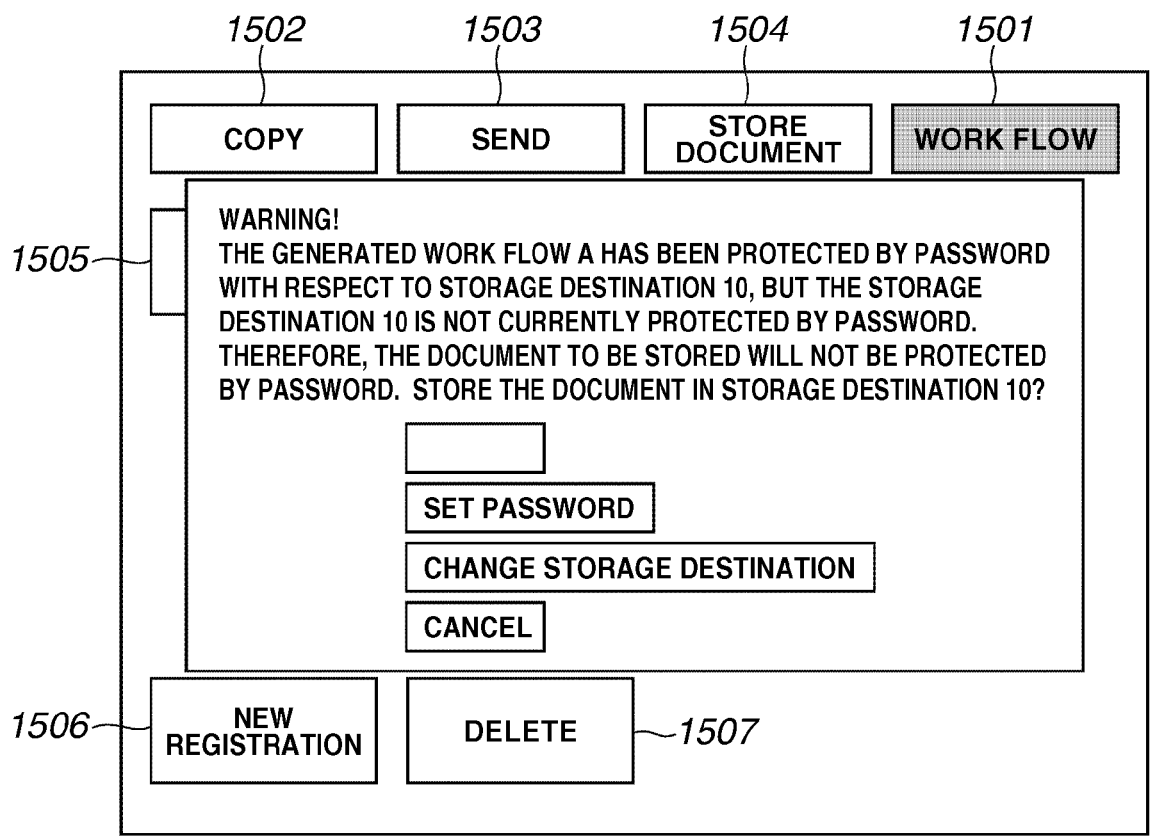
FIG. 17 illustrates an example of a screen displayed when the user issues an instruction for performing a work flow on the digital MFP according to an exemplary embodiment of the present invention.
Figure 18:
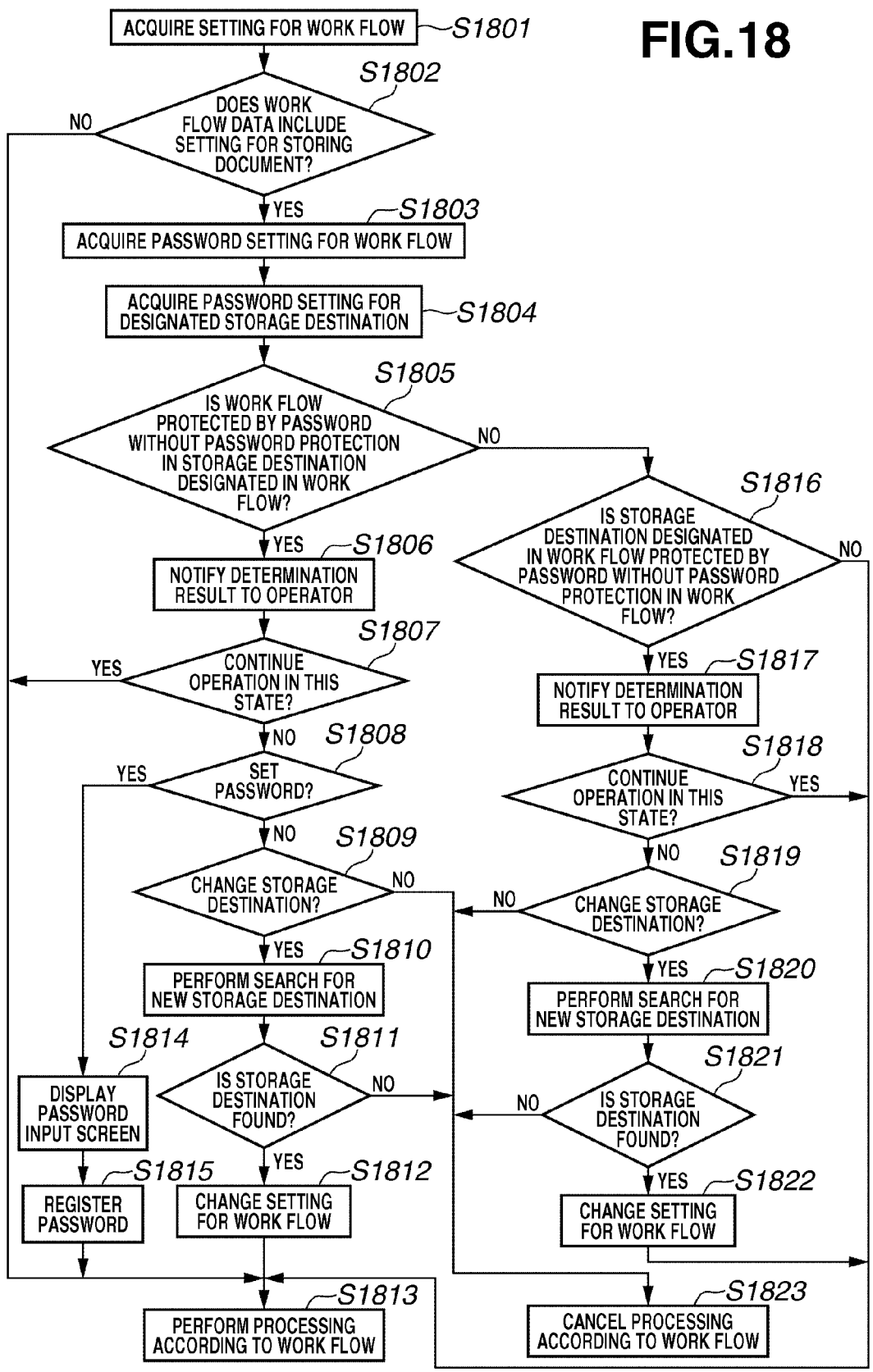
FIG. 18 is a flow chart illustrating an example of processing performed by a work flow management module when the user issues an instruction for performing the work flow according to an exemplary embodiment of the present invention.

FIG. 17 illustrates an example of a screen displayed when the user has issued an instruction for performing the work flow A on the digital MFP 102 according to the present exemplary embodiment. FIG. 18 is a flow chart illustrating an example of processing performed by the work flow management module 313 when the user issues an instruction for performing the work flow A. Hereinbelow, the processing performed by the work flow management module 313 will be described with reference to FIG. 18.

Referring to FIG. 18, in step S1801, the work flow management module 313 of the digital MFP 102 analyzes the work flow data of the work flow A, which the user has instructed. More specifically, the work flow management module 313 analyzes the content of the work flow described in the XML format, as illustrated in FIG. 9.

In step S1802, the work flow management module 313 determines whether the work flow data of the work flow A, which the user has instructed, includes a setting for the document storage operation. More specifically, in the example illustrated in FIG. 9, the work flow management module 313 determines whether information about a category of a function in the XML data describes "store".

If it is determined in step S1802 that the work flow data of the work flow A does not include a setting for the document storage operation (NO in step S1802), then the work flow import/export module 301 advances to step S1813. In step S1813, the work flow management module 313 performs the processing according to the work flow. On the other hand, if it is determined in step S1802 that the work flow data of the work flow A includes a setting for the document storage operation (YES in step S1802), then the work flow management module 313 advances to step S1803.

In step S1803, the work flow management module 313 acquires information about the password protection in the setting for the document storage operation.

More specifically, the work flow management module 313 refers to the data 907 in FIG. 9 to determine whether the password protection has been set in the setting for the document storage operation. That is, the work flow management module 313 determines whether the storage destination 10 is protected by a password in the digital MFP (in the present exemplary embodiment, the digital MFP 101) that has generated the work flow.

In step S1804, the work flow management module 313 accesses the electronic document storage module 306 to acquire information about whether the storage destination designated in the work flow is protected by a password.

In the work flow in FIG. 9, the storage destination 10 is designated as the storage destination. In the present exemplary embodiment, the work flow management module 313 acquires, from the electronic document storage module 306, information about whether the storage destination 10, which is the storage destination designated for the work flow management module 313 itself, is protected by the password. Then, the work flow management module 313 compares the setting for the work flow with the setting for the storage destination as to the presence of password protection.

That is, in step S1805, the work flow management module 313 determines whether the work flow is protected by a password without password protection in the storage destination designated in the work flow.

If it is determined in step S1805 that the work flow is protected by a password without password protection in the storage destination designated in the work (YES in step S1805), then the work flow management module 313 determines that the storage destination of the digital MFP 101 has been protected by a password when the work flow was generated on the digital MFP 101 (sending source apparatus) but the storage destination of the digital MFP 102 having the same storage destination number as the storage destination for the digital MFP 101 is not protected by a password, with respect to the digital MFP 102 that performs the work flow. In step S1806, the work flow management module 313 displays a screen displaying a message indicating the protection state to the user, as illustrated in FIG. 17.

This is because at the time the work flow is generated, the user assumes that the storage destination for the digital MFP 101 is protected by a password. Accordingly, the user supposes that the electronic document can be stored in the storage destination to which a password is set and protected by the set password, by performing the work flow.

Therefore, if the user performs the same work flow in the digital MFP 102 without any notification and the electronic document is stored in the storage destination set for the digital MFP 102, which is not protected by a password, then the electronic document is stored in the storage destination where the electronic document is not protected, so that any other user can browse the stored electronic document.

In order to address this, the screen illustrated in FIG. 17 displays a plurality of alternative processing to the user together with the notification, and the work flow management module 313 waits until the user issues an instruction. The alternative processing includes "continue", "set a password", "change the storage destination", and "cancel".

In step S1807, the work flow management module 313 determines whether the user has selected "continue operation".

If it is determined in step S1807 that the user has selected "continue operation" (YES in step S1807), then the work flow management module 313 advances to step S1813. In step S1813, the work flow management module 313 performs the processing according to the work flow. In this case, the data is stored in the storage destination that is not protected by a password.

In step S1808, the work flow management module 313 determines whether the user has selected the "set a password" operation.

If it is determined in step S1808 that the user has selected the "set a password" operation (YES in step S1808), then the work flow management module 313 advances to step S1814. In step S1814, the work flow management module 313 displays a password input screen on the operation screen. More specifically, the work flow management module 313 displays a screen similar to the screen illustrated in FIG. 11.

In step S1815, the user enters a password. When the user enters the password, the work flow management module 313 sets the entered password to the designated storage destination.

Then, the work flow management module 313 advances to step S1813. In step S1813, the work flow management module 313 performs the processing according to the work flow. In this case, the data is stored in the storage destination where a password protection is set. Thus, the work flow can be performed with a policy which was adopted when the work flow was generated.

In step S1809, the work flow management module 313 determines whether the user has selected the "change the storage destination" operation.

If it is determined in step S1809 that the user has selected the "change the storage destination" operation (YES in step S1809), then the work flow management module 313 advances to step S1810. In step S1810, the work flow management module 313 searches for a storage destination that is protected by a password, from among the storage destinations held in the digital MFP 102.

In step S1811, the work flow management module 313 determines whether a storage destination protected by a password is found. If it is determined in step S1811 that a storage destination protected by a password is found (YES in step S1811), then the work flow management module 313 displays a list of the found storage destinations on the screen to prompt the user to select and designate the storage destination from among the storage destinations listed on the screen.

After the user has designated the storage destination, the work flow management module 313 advances to step S1812.

In step S1812, the work flow management module 313 changes the storage destination described in the work flow to the newly designated storage destination.

Then, the work flow management module 313 advances to step S1813. In step S1813, the work flow management module 313 performs the processing according to the changed work flow.

In this case, the data is stored in the storage destination where a password protection is set. Thus, the work flow can be performed with a policy which was adopted when the work flow was generated.

In addition, since the data is stored in the storage destination where a password protection is set, it is not necessary for the user to set a password to the storage destination to which a password is not set.

On the other hand, if it is determined in step S1811 that no storage destination is found (NO in step S1811), then the work flow management module 313 determines that the processing according to the work flow cannot be performed, and then ends the processing.

When the user selects the "cancel" operation via the screen in FIG. 17, the results of the determinations in steps S1807, S1808, and S1809 are all NO. In this case, the work flow management module 313 advances to step S1823. In step S1823, the work flow management module 313 determines that the processing according to the workflow cannot be performed. Then, the work flow management module 313 ends the processing.

On the other hand, if it is not determined in step S1805 that the work flow is protected by a password without password protection in the storage destination designated in the work flow (NO in step S1805), then the work flow management module 313 advances to step S1816. In step S1816, the work flow management module 313 determines whether the storage destination designated in the work flow is protected by a password without password protection in the work flow.

Figure 19:
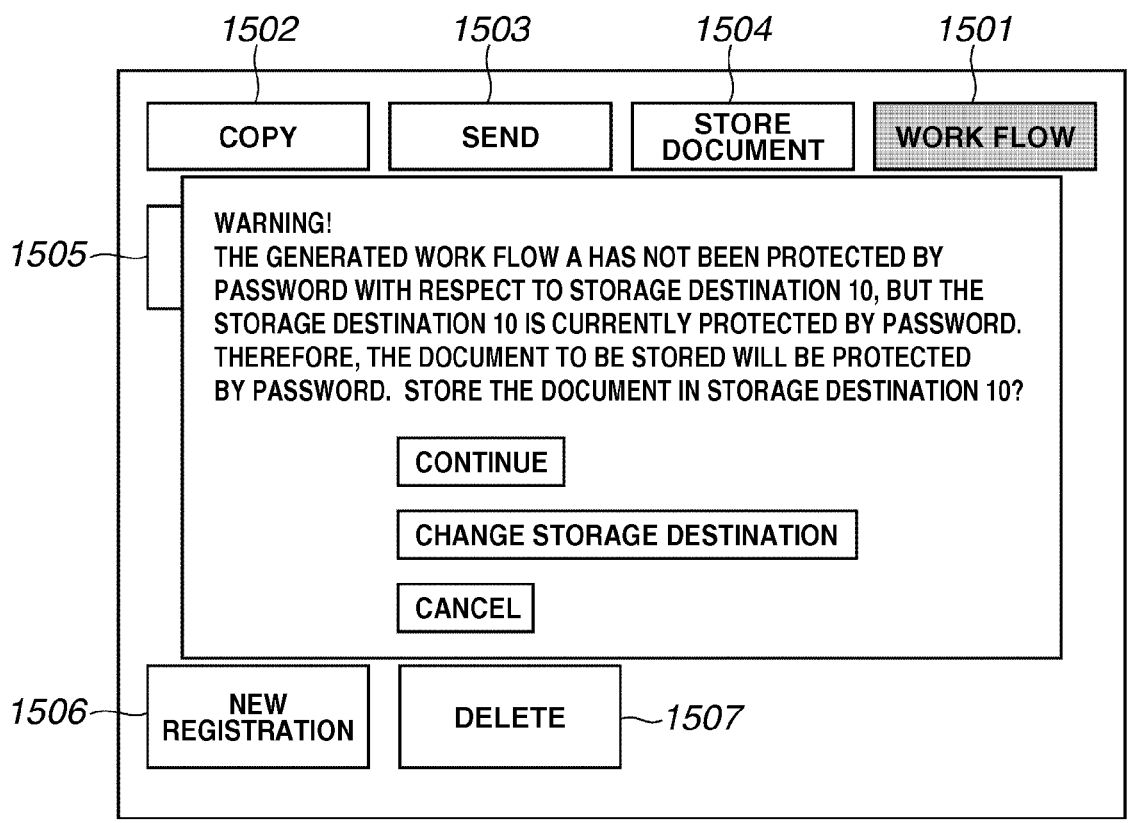
FIG. 19 illustrates an example of a screen displayed when the user has issued an instruction for performing a work flow on the digital MFP according to an exemplary embodiment of the present invention.

If it is determined in step S1816 that the storage destination designated in the work flow is protected by a password without password protection in the work flow (YES in step S1816), then the work flow management module 313 determines that the storage destination of the digital MFP 101 is not protected by a password when the work flow was generated on the digital MFP 101 but the storage destination of the digital MFP 102 having the same storage destination number as the storage destination for the digital MFP 101 is protected by a password, while the digital MFP 102 performs the workflow. In step S1817, the work flow management module 313 displays a screen displaying a message indicating the protection state to the user, as illustrated in FIG. 19.

This is because at the time the work flow is generated, the user assumes that the storage destination for the digital MFP 101 is not protected by a password. Accordingly, the user supposes that the electronic document is stored in the storage destination to which a password protection is not set, by performing the work flow.

Therefore, if the user performs the same work flow in the digital MFP 102 without any notification and the electronic document is stored in the storage destination set for the digital MFP 102, which is not protected by a password, then the electronic document is stored in the storage destination protected by a password which is set by a third party user.

If the user performs the work flow and stores the electronic document, the user cannot browse, print, or delete the stored electronic document because the user does not have the password for the storage destination set by the third party user. On the other hand, the third party user having set the password to the storage destination can browse, print, and delete the stored electronic document.

In order to address this, the screen illustrated in FIG. 19 displays a plurality of alternative processing, together with the notification, and the work flow management module 313 waits until the user issues an instruction. The alternatives for the processing include "continue", "change the storage destination", and "cancel".

In step S1818, the work flow management module 313 determines whether the user has selected "continue operation".

If it is determined in step S1818 that the user has selected "continue operation" (YES in step S1818), then the work flow management module 313 advances to step S1813. In step S1813, the work flow management module 313 performs the processing according to the work flow. In this case, the data is stored in the storage destination that has been protected by a password.

In step S1819, the work flow management module 313 determines whether the user has selected the "change the storage destination" operation.

If it is determined in step S1819 that the user has designated the "change the storage destination" operation (YES in step S1819), then the work flow management module 313 advances to step S1820. In step S1820, the work flow management module 313 searches for a storage destination that is not protected by a password from among the storage destinations held in the digital MFP 102.

In step S1821, the work flow management module 313 determines whether a storage destination that is not protected by a password is found.

If it is determined in step S1821 that a storage destination that is not protected by a password is found (YES in step S1821), then the work flow management module 313 displays a list of thus found storage destinations on the screen. The user selects and designates the storage destination from among the storage destinations listed in the screen.

After the user has designated the storage destination, the work flow management module 313 advances to step S1822. In step S1822, the work flow management module 313 changes the storage destination described in the work flow to the newly designated storage destination.

Then, the work flow management module 313 advances to step S1813. In step S1813, the work flow management module 313 performs the processing according to the changed work flow. In this case, the data is stored in the storage destination to which a password protection has not been set.

Thus, the work flow can be performed with a policy which was adopted when the work flow was generated. On the other hand, if it is determined in step S1821 that no storage destination is found (NO in step S1821), then in step S1823, the work flow management module 313 determines that the processing according to the work flow cannot be performed, and then ends the processing.

When the user selects the "cancel" operation via the screen in FIG. 19, the results of the determinations in steps S1818 and S1819 are both NO. In this case, the work flow management module 313 advances to step S1823. In step S1823, the work flow management module 313 determines that the processing according to the workflow cannot be performed. Then, the work flow management module 313 ends the processing.

As described above, the work flow management module 313 performs the processing when the user gives an instruction for performing a work flow.

According to the present exemplary embodiment, when a work flow is performed which has been defined by one digital MFP, the user can instruct and perform on another digital MFP the processing having security settings for a document storage operation which have been intended at the time of generating the work flow.

In the above-described present exemplary embodiment, the work flow generated in the digital MFP 101 is once imported by the terminal apparatus 103, and then the terminal apparatus 103 exports the imported work flow to the digital MFP 102. That is, the work flow generated by the digital MFP 101 is sent to the digital MFP 102 via the terminal apparatus 103.

However, the work flow file can also be directly sent from the digital MFP 101 to the digital MFP 102 without once exporting the work flow file to the terminal apparatus 103. In this case, the user can issue an instruction via the operation unit 207 of the digital MFP 101 to send the work flow file to the digital MFP 102.

Alternatively, the user can issue an instruction from the operation unit 207 of the digital MFP 102, which is a work flow file receiving apparatus, to acquire the work flow file from the digital MFP 101.

Thus, it is not necessary for a user to operate the terminal apparatus 103 every time the work flow is sent or received.

Furthermore, in the above-described exemplary embodiment, the work flow management module 313 determines whether a data storage destination is protected by a password. However, the content of a specific setting registered in a data storage destination is not limited to the password protection.

For example, the work flow management module 313 can determine an automatic erasure time for erasing the data stored in a storage destination at a predetermined timing (e.g., one day or ten hours).

Furthermore, a print setting for performing settings, for example, as to one-sided/two-sided printing, a color mode, a page imposition such as "2 in 1" printing, and stapling can be registered in the storage destination in the case of printing data stored in the storage destination.

Other Exemplary Embodiments

The present invention can be applied to a system including a plurality of devices (e.g., a computer, an interface device, a reader, a printer, a file server) and also to an apparatus that includes only a single device.

Furthermore, the present invention can also be achieved by providing a system or a device with a storage medium (or a recording medium) that stores program code of software implementing the functions of the embodiments and by reading and executing the program code stored in the storage medium with a computer of the system or the device (a CPU or a micro processing unit (MPU)).

In this case, the program code itself, which is read from the storage medium, implements the functions of the embodiments mentioned above, and accordingly, the storage medium storing the program code constitutes the present invention.

In addition, the functions according to the embodiments described above can be implemented not only by executing the program code read by the computer, but also implemented by the processing in which an operating system (OS) or the like carries out a part of or the whole of the actual processing based on an instruction given by the program code.

As the storage medium for supplying such program code, a floppy disk, a hard disk, an optical disk, a magneto-optical disk (MO), a compact disk-read only memory (CD-ROM), a CD-recordable (CD-R), a CD-rewritable (CD-RW), a magnetic tape, a nonvolatile memory card, a ROM, and a digital versatile disk (DVD (a DVD-recordable (DVD-R) or a DVD-rewritable (DVD-RW)), for example, can be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-336007 filed Dec. 13, 2006, which is hereby incorporated by reference herein in its entirety.

What is claimed is:

1. An image processing apparatus having a storage device configured to store data, the storage device having a plurality of storage areas managed by common identification information among a plurality of image processing apparatuses, comprising:
   a receiving unit configured to receive, from another image processing apparatus which is included in the plurality of image processing apparatuses and is different from the image processing apparatus, a processing flow for performing processing of storing of data which is to be performed in the another image apparatus, wherein the processing flow includes identification information indicating a storage area which is to be a storage destination of data and information indicating that an access control has been set to the storage area;
   an instruction unit configured to instruct the processing with an instruction according to the processing flow received by the receiving unit; and
   a control unit configured to perform the processing based on the processing flow in accordance with the instruction of the instruction unit in a case where the access control has been set to the storage area indicated by the identification information included in the processing flow among the plurality of storage areas of the storage device included in the image processing apparatus, and to restrict the performance of the processing in a case where the access control has not been set.

2. The image processing apparatus according to claim 1, wherein the processing flow is generated by the another image processing apparatus in communication with the image processing apparatus via a network.

3. The image processing apparatus according to claim 1, further comprising a setting unit configured, in performing the processing based on the processing flow according to the instruction given by the instruction unit, to set an access control to the storage area if the storage area is not under an access control.

4. The image processing apparatus according to claim 1, further comprising a search unit configured, in performing the processing based on the processing flow according to the instruction given by the instruction unit, to search for another storage area that is under an access control, if the storage area is not under the access control.

5. The image processing apparatus according to claim 1, wherein the received processing flow further includes an instruction regarding at least one of a copy operation or a send operation to be performed by the image processing apparatus.

6. A method in an image processing apparatus having a storage device configured to store data, the storage device having a plurality of storage areas managed by common identification information among a plurality of image processing apparatuses, comprising:
   receiving, from another image processing apparatus which is included in the plurality of image processing apparatuses and is different from the image processing apparatus, a processing flow for performing processing of storing of data which is to be performed in the another image processing apparatus, wherein the processing flow includes identification information indicating a storage area which is to be a storage destination of data and information indicating that an access control has been set to the storage area;
   instructing the processing with an instruction according to the processing flow; and
   performing the processing based on the processing flow in accordance with the instruction of the instruction unit in a case where the access control has been set to the storage area indicated by the identification information included in the processing flow among the plurality of storage areas of the storage device included in the image processing apparatus, and restricting the performance of the processing in a case where the access control has not been set.

7. The method according to claim 6, wherein the received processing flow further includes an instruction regarding at least one of a copy operation or a send operation to be performed by the image processing apparatus.

* * * * *